United States Patent
Naruse

(10) Patent No.: US 7,415,770 B2
(45) Date of Patent: Aug. 26, 2008

(54) WHEEL ALIGNMENT ANGLE MEASURING APPARATUS AND WHEEL ALIGNMENT ANGLE MEASURING METHOD

(75) Inventor: Yutaka Naruse, Nishitokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/662,408

(22) PCT Filed: Sep. 8, 2005

(86) PCT No.: PCT/JP2005/016509

§ 371 (c)(1),
(2), (4) Date: Mar. 9, 2007

(87) PCT Pub. No.: WO2006/028166

PCT Pub. Date: Mar. 16, 2006

(65) Prior Publication Data

US 2008/0022540 A1 Jan. 31, 2008

(30) Foreign Application Priority Data

Sep. 9, 2004 (JP) .............................. 2004-262229

(51) Int. Cl.
*G01B 5/24* (2006.01)
(52) U.S. Cl. .................. 33/203.13; 33/203.12; 73/117
(58) Field of Classification Search .................. 33/203, 33/203.12, 203.13, 203.14; 73/117, 123–127
See application file for complete search history.

(56) References Cited

U.S. PATENT DOCUMENTS

| | | | |
|---|---|---|---|
| 6,256,894 B1 | 7/2001 | Naruse et al. | |
| 6,374,159 B1 | 4/2002 | Naruse et al. | |
| 6,460,259 B1 | 10/2002 | Naruse | |
| 6,564,461 B1 * | 5/2003 | Naruse | 33/203 |
| 7,100,290 B2 * | 9/2006 | Hara et al. | 33/203.13 |
| 2007/0289151 A1 * | 12/2007 | Doan | 33/203 |

FOREIGN PATENT DOCUMENTS

| | | |
|---|---|---|
| EP | 0 816 801 A2 | 1/1998 |
| JP | 8-334440 A | 12/1996 |
| JP | 2000-43750 A | 2/2000 |
| JP | 2000-62639 A | 2/2000 |
| JP | 2001-30945 A | 2/2001 |

OTHER PUBLICATIONS

European Search Report dated Aug. 29, 2007.

* cited by examiner

*Primary Examiner*—Yaritza Guadalupe-McCall
(74) *Attorney, Agent, or Firm*—Sughrue Mion, PLLC

(57) ABSTRACT

A wheel alignment angle measuring apparatus according to the present invention computes variation energy sums $E_A"$ and $E_B"$ and a reference wheel referencing alignment angle (a toe angle $T_{BR}$) based on an anteroposterior force variation rate $d_{Fx}$ and a lateral force variation rate $d_{Fy}$ generated in a reference wheel (RL). Furthermore, the alignment angle measuring apparatus computes a non-reference wheel referencing alignment angle (a toe angle $T_{NBR}$) of a non-reference wheel (FL), and then computes a toe angle $T_{NBA}$ to be specified for the non-reference wheel, based on the toe angle $T_{NBR}$ and a difference between a toe angle $T_{BR}$ and the toe angle $T_I$. According to the thus configured wheel alignment angle measuring apparatus, it is possible to determine a value of an alignment angle that allows characteristics of lateral forces generated in front and rear wheels to be approximated to each other, when the alignment angles of wheels are adjusted based on the characteristics of the lateral forces generated in the wheels.

12 Claims, 13 Drawing Sheets

FIG. 12
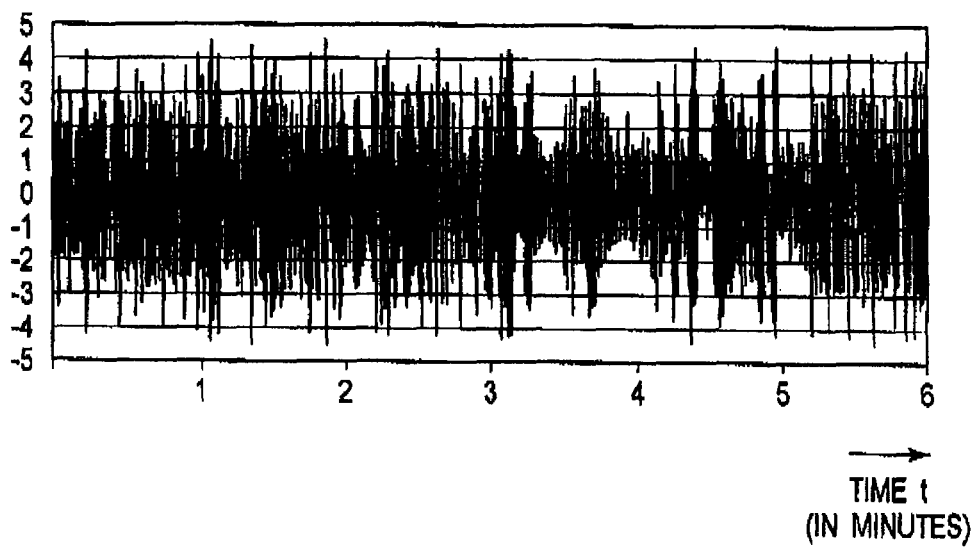
(a) STANDARD TOE ANGLE
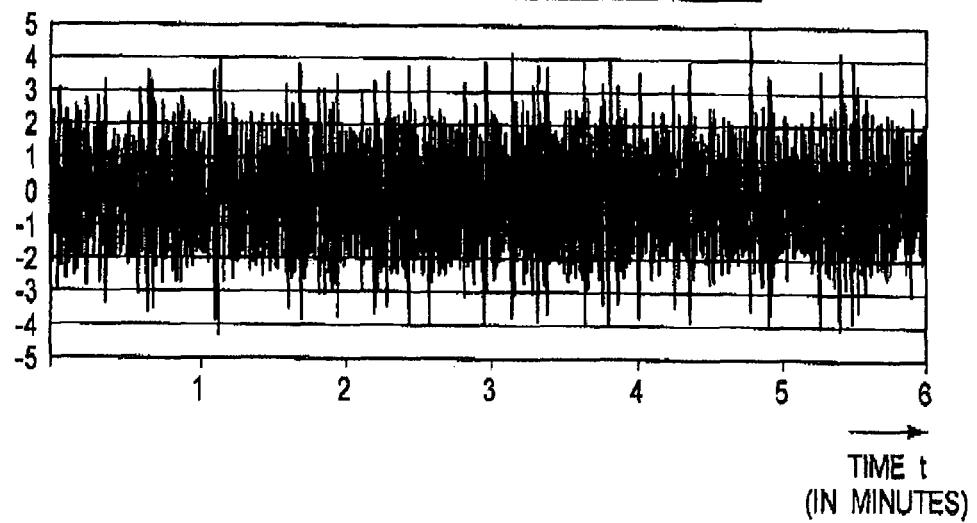
(b) TOE ANGLE (T_NBA) AFTER ADJUSTMENT

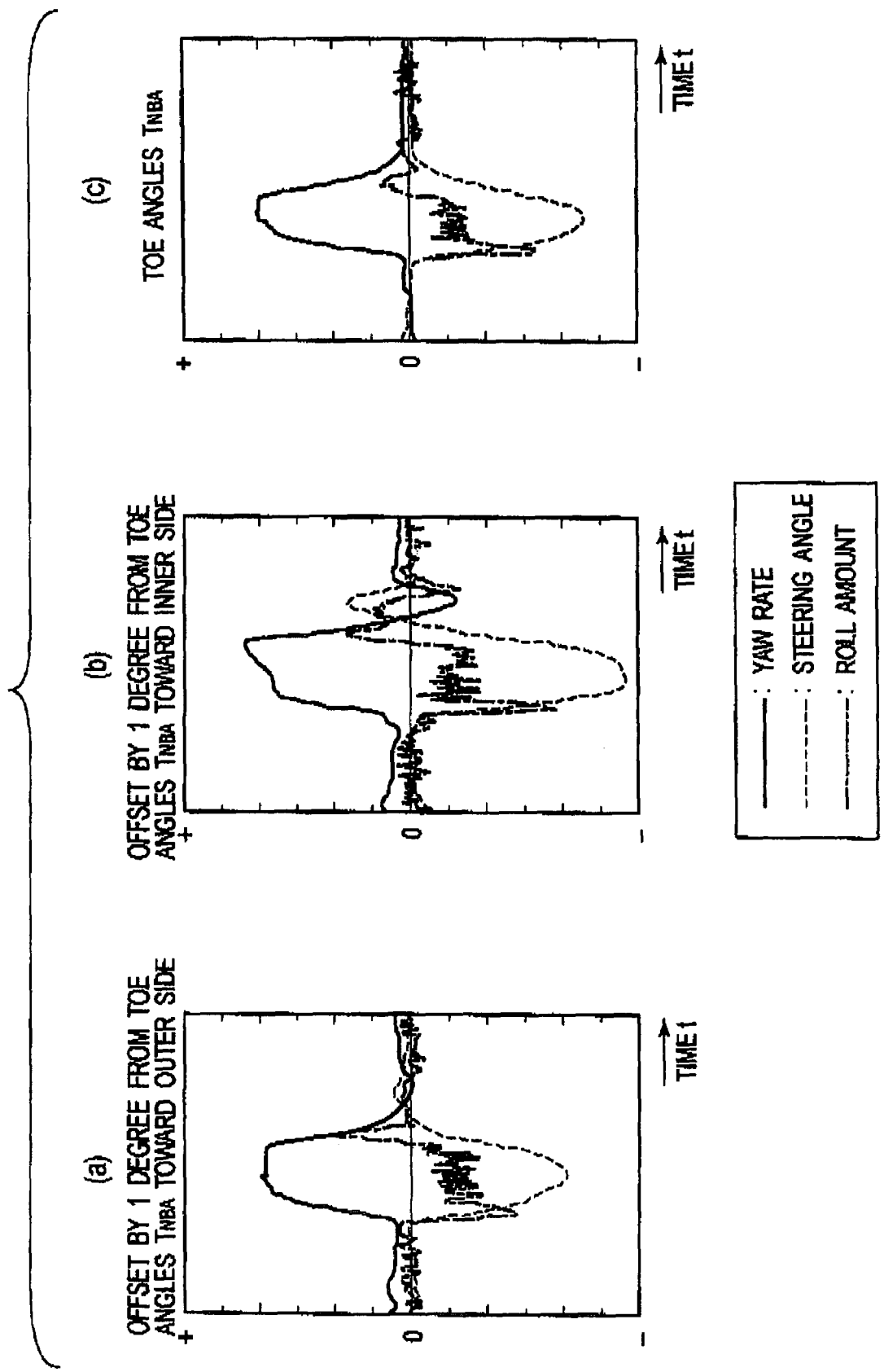

WHEEL ALIGNMENT ANGLE MEASURING APPARATUS AND WHEEL ALIGNMENT ANGLE MEASURING METHOD

TECHNICAL FIELD

The present invention relates to a wheel alignment angle measuring apparatus and a wheel alignment angle measuring method, which are used for measuring alignment angles of wheels mounted on a vehicle.

BACKGROUND ART

For a wheel of a four-wheeled motor vehicle (hereinafter, as appropriate, referred to as a vehicle in short) such as a passenger automobile, certain "alignment angles" including a camber angle (an angle formed by a longitudinal center line of the wheel and a plumb line when the wheel mounted on the vehicle is viewed from a front face of the vehicle), a toe angle (an angle formed by a horizontal diameter line (a equatorial line) of the wheel, and a straight line passing the anteroposterior center of the vehicle when the vehicle travels straight forward), and a caster angle (an angle formed by a king pin shaft and a plumb line when the wheel is viewed from a side face of the vehicle) are generally determined in consideration of: obtainment of traveling stability (for example, steerability and stability); and prevention of local abrasion of a pneumatic tire mounted on a vehicle.

A specified value of those alignment angles is determined for each vehicle in a designing stage of vehicles, and the alignment angles of each wheel are adjusted, as needed, based on the specified value by use of a wheel alignment angle measuring apparatus (what is termed a wheel alignment measuring apparatus), for example, in replacing a pneumatic tire or a tire wheel.

Additionally, a method of adjusting an alignment angle (toe angle), which should be specified, is disclosed in consideration of a possibility that an ideal value of the alignment angles may change with a change of vehicle conditions such as a case where pneumatic tires or tire wheels mounted on a vehicle are exchanged (for example, Japanese Patent Application Laid-open Publication No. 2000-62639 (pp. 4-7 and FIG. 15)) In this method, the alignment angle (toe angle) is adjusted according to a characteristic of a lateral force Fy generated in a wheel, more specifically, a variation rate of the lateral force Fy (for example, the sum of squares of a first-order differential value).

In this adjusting method, first of all, the lateral force Fy is continuously measured in a predetermined period including a time point when a reference wheel (for example, a rear wheel) runs on a predetermined protrusion (for example, a plate-like object). Subsequently, based on a waveform indicating temporal changes of the lateral force Fy generated in the rear wheel, a toe angle of a non-reference wheel (for example, a front wheel) generating a lateral force Fy forming a waveform approximated as much as possible is obtained through an arithmetic operation.

According to the adjustment method, a variation rate (a characteristic) of the lateral forces Fy generated respectively in the rear wheel and in the front wheel become equal to each other, whereby a steering characteristic of a vehicle can be made close to the neutral steer.

However, the above described method of adjusting an alignment angle (a toe angle) has had a problem that should be solved for improvement. In other words, in the above described method of adjusting an alignment angle (a toe angle), the toe angle of the front wheel generating the lateral force Fy forming the waveform approximated as much as possible to the foregoing waveform is obtained through the arithmetic operation based on the waveform indicating the temporal changes of the lateral force Fy generated in the rear wheel, but there has been a limit in adjusting the toe angle so as to generate the lateral force Fy forming the waveform approximated as much as possible to the foregoing waveform.

That is, there has been a problem that, depending on a kind or the like of a vehicle, a pneumatic tire or a tire wheel, there is a case where temporal changes of the lateral force Fy generated in the front wheel cannot be sufficiently approximated to the temporal changes of the lateral force Fy generated in the rear wheel.

Consequently, the present invention has been made in consideration of a situation as described above, and an object of the present invention is to provide a wheel alignment angle measuring apparatus and a wheel alignment angle measuring method, which can determine an alignment angle enabling characteristics of lateral force generated respectively in a front wheel and in a rear wheel to be approximated to each other.

DISCLOSURE OF THE INVENTION

The present invention has the following characteristics. First of all, a first characteristic of the present invention is summarized as a wheel alignment angle measuring apparatus including: a sensor signal receiving unit (a sensor signal receiving unit 503) configured to receive output signals from a sensor (a force sensor 252) which measures a value of a lateral force (a lateral force Fy) generated in a reference wheel (for example, a wheel 20R) in a predetermined period (a period T) including a deformation maximum time point when deformation of the reference wheel becomes substantially maximum due to an event that the reference wheel runs on a predetermined protrusion (a protrusion 238), the reference wheel being any one of wheels provided with pneumatic tires and mounted on a vehicle (a four-wheeled motor vehicle 10), a variation energy sum computing unit (a variation energy sum computing unit 507) configured to compute a first-half-period variation energy sum (a variation energy sum $E_A''$) which is a sum of variation rate (lateral force variation rate dry) of the lateral force in a first half period (a zone A) until the deformation maximum time point (P2), and a last-half-period variation energy sum (a variation energy sum $E_B''$) which is a sum of variation rate of the lateral force in a last half period (a zone B) from the deformation maximum time point using the output signals respectively; a reference-wheel referencing alignment angle computing unit (an alignment angle computing unit 509) configured to compute a reference wheel referencing alignment angle (a toe angle $T_{BR}$) which is an alignment angle at an intersection (for example, a singularity $P_{RL}$) of a first-half-period straight line (a zone A straight line $S_A$) determined based on a value of the first-half-period variation energy sum when an alignment angle (for example, toe angle) of the reference wheel vary, and a last-half-period straight line (a zone B straight line $S_B$) determined based on a value of the last-half-period variation energy sum when the alignment angle of the reference wheel vary; and a non-reference wheel setting alignment angle computing unit (the alignment angle computing unit 509) configured to compute, based on the reference wheel referencing alignment angle, a non-reference wheel setting alignment angle (a toe angle $T_{NBA}$) to be specified for a non-reference wheel (for example, a wheel 20F) mounted on the vehicle in a position different in an anteroposterior direction from a position in which the reference wheel is mounted.

According to the wheel alignment angle measuring apparatus as described above, the non-reference wheel setting alignment angle is computed based on the reference wheel referencing alignment angle which is an alignment angle at the intersection of the first-half-period straight line determined based on the value of the first-half-period variation energy sum, and the last-half-period straight line determined based on the value of the last-half-period variation energy sum.

For this reason, the non-reference wheel setting alignment angle can be specified easily and reliably. This is because it is not necessary to execute complicated processing of approximating temporal changes of the lateral force Fy generated in the non-reference wheel to temporal changes of the lateral force Fy generated in the reference wheel, while the complicated processing is required in the above described conventional alignment angle (toe angle) adjusting method.

Additionally, although there has been a problem in the conventional alignment angle adjusting method that temporal changes of the lateral force Fy generated in the non-reference wheel sometimes cannot be sufficiently approximated to the temporal changes of the lateral force Fy generated in the reference wheel, such a problem can be avoided.

A second characteristic of the present invention relates to the first characteristic of the present invention, and is summarized in that: the wheel alignment angle measuring apparatus further includes a reference wheel ideal alignment angle computing unit (the alignment angle computing unit 509) configured to compute, based on the sum of squares of variation rate of the lateral force when the alignment angle of the reference wheel vary, a reference wheel ideal alignment angle (a toe angle $T_I$) giving the minimum sum of squares of the variation rate; and the reference wheel ideal alignment angle computing unit computes the non-reference wheel setting alignment angle based on the reference wheel referencing alignment angle and the reference wheel ideal alignment angle.

A third characteristic of the present invention relates to the second characteristic of the present invention, and is summarized in that: the wheel alignment angle measuring apparatus further includes a non-reference wheel referencing alignment angle computing unit (the alignment angle computing unit 509) configured to compute a non-reference wheel referencing alignment angle (a toe angle $T_{NBR}$) which is an alignment angle at an intersection (for example, a singularity $P_{FL}$) of a first-half-period straight line of the non-reference wheel, and a last-half-period straight line, and the non-reference wheel referencing alignment angle computing unit computes the non-reference wheel referencing alignment angle based on a difference between the reference wheel referencing alignment angle and the reference wheel ideal alignment angle, and the non-reference wheel referencing alignment angle.

A fourth characteristic of the present invention relates to the first characteristic of the present invention, and is summarized in that: the sensor signal receiving unit further receives output signals from a sensor which measures a value of an anteroposterior force generated in the reference wheel in the predetermined period, and the variation energy sum computing unit determines any one of the first half period and the last half period based on a first-order differential value is of the anteroposterior force.

A fifth characteristic of the present invention relates to the first characteristic of the present invention, and is summarized in that: the variation energy sum computing unit computes any one of the first-half-period variation energy sum and the last-half-period variation energy sum by using a second-order differential value of the lateral force as the variation rate of the lateral force.

A sixth characteristic of the present invention relates to the second characteristic of the present invention, and is summarized in that the reference wheel ideal alignment angle computing unit computes the sum of squares by using a second-order differential value of the lateral force as the variation rate of the lateral force.

A seventh characteristic of the present invention is summarized as a wheel alignment angle measuring method including the steps of: receiving output signals from a sensor which measures a value of a lateral force generated in a reference wheel in a predetermined period including a deformation maximum time point when deformation of the reference wheel becomes substantially maximum due to an event that the reference wheel runs on a predetermined protrusion, the reference wheel being any one of wheels provided with pneumatic tires and mounted on a vehicle; computing a first-half-period variation energy sum which is a sum of variation rate of the lateral force in a first half period until the deformation maximum time point, and a last-half-period variation energy sum which is a sum of variation rate of the lateral force in a last half period from the deformation maximum time point using the output signals respectively; computing a reference wheel referencing alignment angle which is an alignment angle at an intersection of a first-half-period straight line determined based on a value of the first-half-period variation energy sum when an alignment angle of the reference wheels vary, and a last-half-period straight line determined based on a value of the last-half-period variation energy sum when the alignment angle of the reference wheel vary; and computing a non-reference wheel setting alignment angle based on the reference wheel referencing alignment angle, the non-reference wheel setting alignment angle to be specified for a non-reference wheel mounted on a vehicle in a position different in an anteroposterior direction from a position in which the reference wheel is mounted.

An eighth characteristic of the present invention relates to the seventh characteristic of the present invention, and is summarized in that: the wheel alignment angle measuring method further includes the step of computing a reference wheel ideal alignment angle based on a sum of squares of variation rate of the lateral force when the alignment angle of the reference wheel vary, the reference wheel ideal alignment angle giving the minimum sum of squares of the variation rate, and in the step of computing the non-reference wheel setting alignment angle, the non-reference wheel setting alignment angle is computed based on the reference wheel referencing alignment angle and the reference wheel ideal alignment angle.

A ninth characteristic of the present invention relates to the seventh characteristic of the present invention, and is summarized in that: the wheel alignment angle measuring method further includes the step of computing a non-reference wheel referencing alignment angle which is an alignment angle at an intersection of a first-half-period straight line of the non-reference wheel, and a last-half-period straight line, and in the step of computing the non-reference wheel referencing alignment angle, the non-reference wheel referencing alignment angle is computed based on the non-reference wheel referencing alignment angle and a difference between the reference wheel s referencing alignment angle and the reference wheel ideal alignment angle.

A tenth characteristic of the present invention relates to the seventh characteristic of the present invention, and is summarized in that: in the step of receiving the output signals, output signals from a sensor which measures a value of an anteroposterior force generated in the reference wheel in the predetermined period are further received, and in the step of computing the variation energy sum, any one of the first half period and the last half period is determined based on the first-order differential value of the anteroposterior force.

A eleventh characteristic of the present invention relates to the seventh characteristic of the present invention, and is summarized in that, in the step of computing the variation energy sum, any one of the first-half-period variation energy sum and the last-half-period variation energy sum is computed by using the second-order differential value of the lateral force as the variation rate of the lateral force.

A twelfth characteristic of the present invention relates to the eighth characteristic of the present invention, and is summarized in that, in the step of computing the reference wheel ideal alignment angle, the sum of squares is computed by using the second-order differential value of the lateral force as the variation rate of the lateral force.

In essence, according to the characteristics of the present invention, it is possible to provide a wheel alignment angle measuring apparatus and a wheel alignment angle measuring method, which are capable of determining a value of an alignment angle allowing characteristics of lateral forces generated respectively in a front wheel and in a rear wheel to be approximated to each other in the case of adjusting an alignment angle of a wheel based on a characteristic of the lateral forces generated in the wheels.

BRIEF DESCRIPTION OF THE DRAWINGS

FIG. 1 is a schematic side view of a wheel alignment angle measuring system according to an embodiment of the present invention.

FIG. 2 is a plan view of a tire drive unit provided to a wheel alignment angle measurement-use lift according to the embodiment of the present invention.

FIG. 3 is a side view of the tire drive unit provided to the wheel alignment angle measurement-use lift according to the embodiment of the present invention.

FIG. 4 is a plan view and a side view of a force sensor, which is provided to the tire drive unit, according to the embodiment of the present invention.

FIG. 5 is a logical block configuration diagram of the wheel alignment angle measuring system according to the embodiment of the present invention.

FIG. 6 is explanatory graphs for explaining variation rate of anteroposterior force and lateral force due to an event that a wheel runs on a protrusion provided on the tire drive unit according to the embodiment of the present invention.

FIG. 7 is a diagram showing an operational flow of the wheel alignment angle measuring system according to the embodiment of the present invention.

FIG. 8 is a diagram showing an operational flow of the wheel alignment angle measuring system according to the embodiment of the present invention

FIG. 9 is graphs showing data measured and computed in the wheel alignment angle measuring system according to the embodiment of the present invention.

FIG. 10 is graphs showing data measured and computed in the wheel alignment angle measuring system according to the embodiment of the present invention.

FIG. 11 is a graph showing results of feeling evaluations performed by a test driver with respect to: vehicles set at alignment angles measured and computed by the wheel alignment angle measuring system according to the embodiment of the present invention; and the vehicles set at alignment angles different from the foregoing alignment angles.

[FIG. 12] FIG. 12 is graphs showing input variation rate of: a vehicle set at alignment angles measured and computed by the wheel alignment angle measuring system according to the embodiment of the present invention; and the vehicle set at alignment angles different from the foregoing alignment angles.

[FIG. 13] FIG. 13 is graphs showing behavior of: a vehicle set at alignment angles measured and computed by the wheel alignment angle measuring system according to the embodiment of the present invention; and the vehicle set at alignment angles different from the foregoing alignment angles.

BEST MODE FOR CARRYING OUT THE INVENTION

Figure 1:
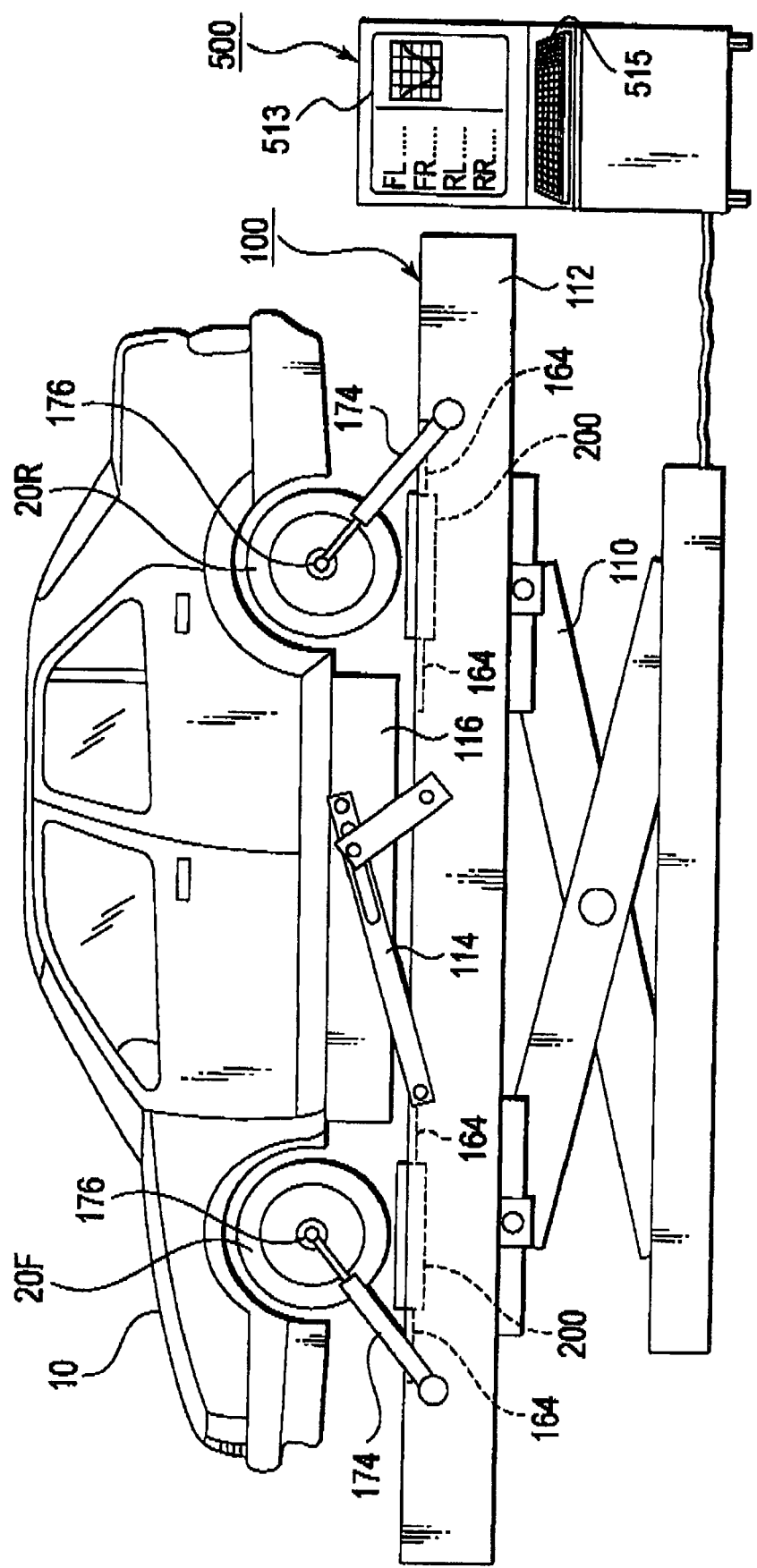
[FIG. 1]

Configuration of wheel alignment angle measuring system including wheel alignment angle measuring apparatus)

Next, with reference to the drawings, description will be given of a configuration of a wheel alignment angle measuring system including a wheel alignment angle measuring apparatus according to an embodiment of the present invention. Note that, in the following description on the drawings, the corresponding or like reference numerals are attached to corresponding or like elements. However, it should be noted that the drawings are schematic, and that ratios of some measurements to others, and the like, are not to scale. Therefore, specific measurements should be judged in consideration of the following description, Additionally, it goes without saying that the respective drawings include parts whose relation and ratio vary also between any ones of the drawings.

(1) Entire Schematic Configuration

First of all, an entire configuration of the wheel alignment angle measuring system will be described. FIG. 1 is a schematic side view of the wheel alignment angle measuring system according to this embodiment. As shown in this drawing, the wheel alignment angle measuring system according to this embodiment is composed of a wheel alignment angle measurement-use lift 100 and a wheel alignment angle measuring apparatus 500.

The wheel alignment angle measurement-use lift 100 includes: a placement table 112 on which a four-wheeled motor vehicle 10 is placed; a main elevating mechanism 110 which elevates and lowers the placement table 112; an auxiliary elevating mechanism 114 which elevates and lowers the four-wheeled motor vehicle 10.

Specifically, the auxiliary elevating mechanism 114 elevates and lowers a vehicle rack 116. By having the vehicle rack 116 elevated, a wheel 20F and a wheel 20R of the four-wheeled motor vehicle 10 can be set apart from the placement table 112 (specifically, wheel drive units 200 which will be later described).

Additionally, the wheel drive units 200 are respectively provided to positions of the placement table 112 which, in a state where the four-wheeled motor vehicle 10 is placed on the placement table 112, respectively abut the wheel 20F and the wheel 20R.

Wheel stopping plates 164 are used for locking wheels of the four-wheeled motor vehicle 10 which are not wheels for which alignment angles are measured. Specifically, each of the wheel stopping plates 164 is composed of a pair of plate-like objects each having one end face thereof turnably supported, and the other end face (free end face) of each of the plate-like objects stops rotation of the wheel 20R (20F) by abutting a ground contacting surface (unillustrated) of the wheel 20R (20F) in a front-to-rear direction and in a rear-to-front direction of the four-wheeled motor vehicle 10.

Note that the each of the wheel stopping plates 164 is connected to a hydraulic cylinder (unillustrated), and is configured to have the other end face thereof abut the ground contacting surface when the hydraulic cylinder is operated.

Rods 174 are attached to the placement table 112, and are configured so as to be turnable, in an anteroposterior direction of the four-wheeled motor vehicle 10, about parts thereof attached to the placement table 112. Additionally, each of the rods 174 is configured so as to be expandable and contractible, and thereby is capable of locating a distance sensor 176 substantially at the center of the wheel 20R (20F), the distance sensor 176 being attached to a tip of the each of the rods 174.

Each of the distance sensors 176 is a sensor for measuring a distance thereof from the wheel 20R (20F). In this embodiment, noncontact sensors using laser light are used for the distance sensors 176.

Note that, although not being illustrated in the drawing, totals of the four wheel drive units 200, the four wheel stopping plates 164, the four rods 174 and the four distance sensors 176 are provided to the wheel alignment angle measurement-use lift 100 in accordance with the number of wheels of the four-wheeled motor vehicle 10. Additionally, the above described configuration of the wheel alignment angle measurement-use lift 100 is the same as that of a wheel alignment angle measurement-use lift disclosed in Japanese Patent Application Laid-open Publication No. 2000-62639.

The wheel alignment angle measuring apparatus 500 is composed of: a display unit 513 for displaying a result of computation of a toe angle (a toe angle $T_{NBA}$) that should be set in the four-wheeled motor vehicle 10, and the like; an operation unit 515; and the like. Note that a logical block configuration of the wheel alignment angle measuring apparatus 500 will be described later.

(2) Configuration of Wheel Drive Unit

Figure 2:
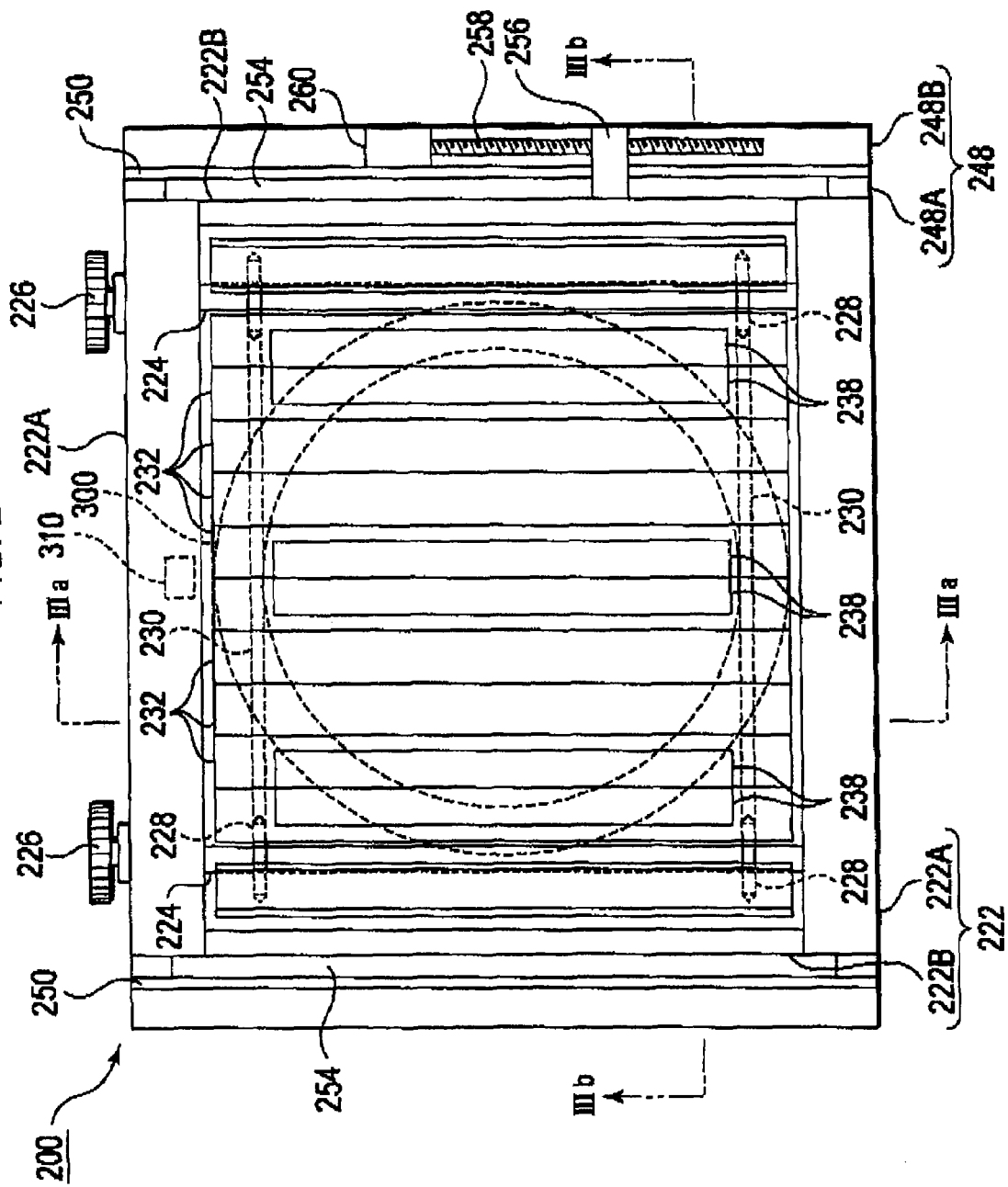
[FIG. 2]
Figure 3:
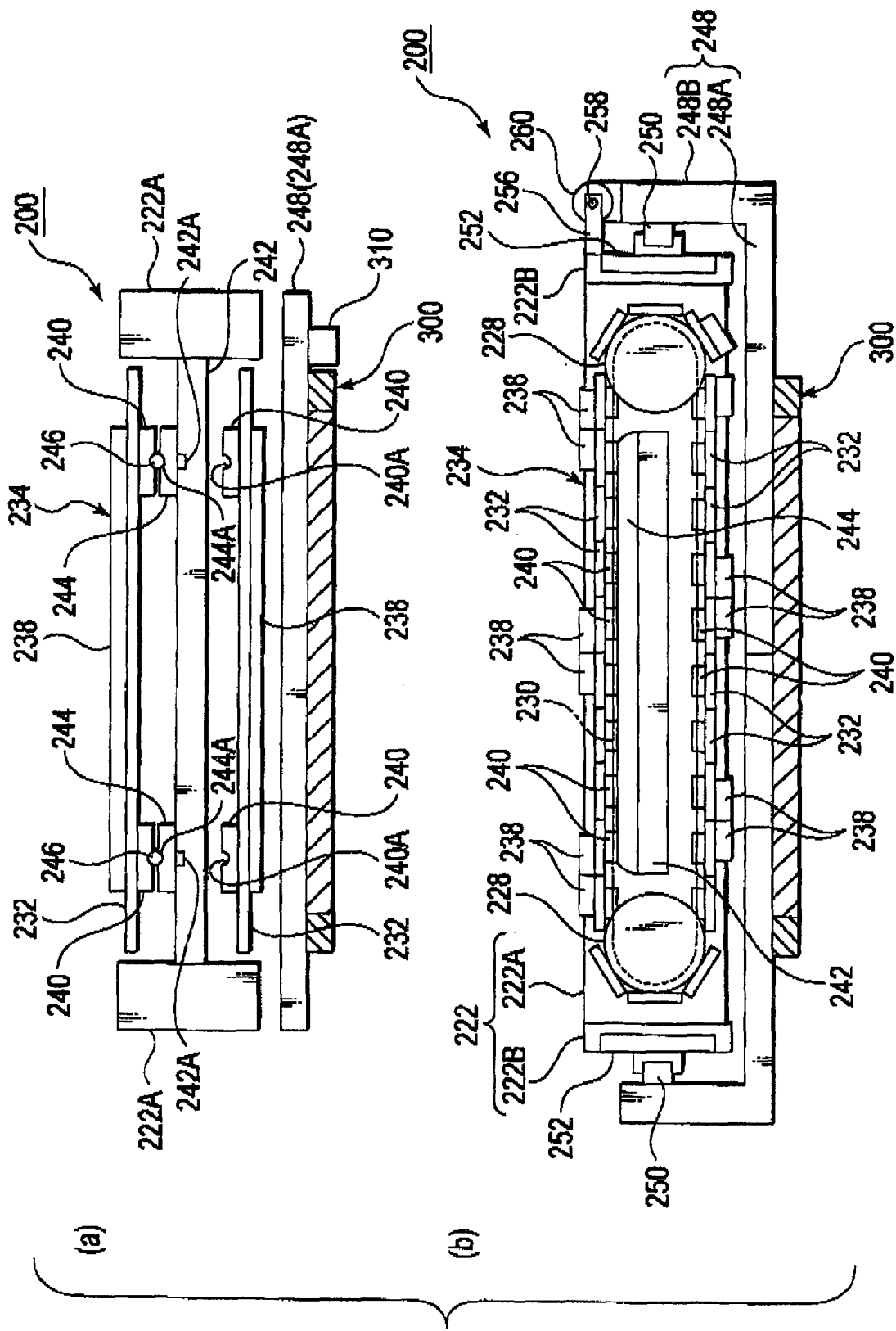
[FIG. 3]

Next, a configuration of the wheel drive unit 200 provided to the wheel alignment angle measurement-use lift 100 will be described with reference to FIG. 2 and FIGS. 3(a) and 3(b). FIG. 2 is a plan view of the wheel drive unit 200. FIG. 3(a) is a cross-sectional view thereof taken along line IIIa-IIIa of FIG. 2, and FIG. 3(b) is a cross-sectional view thereof taken along line IIIb-IIIb of FIG. 2.

The wheel drive unit 200 includes a frame 222 composed of: a pair of main frames 222A; and a side plate connecting the pair of main frames 222A with each other.

A caterpillar 234 formed by connecting a large number of plate pieces 232 made of aluminum alloy with one another is provided in an area inward of the frame 222. The caterpillar 234 is configured so as to be able to revolve in the area inward of the frame 222 by means of sprockets 228 attached to a pair of drive shafts 224.

Additionally, a gear 226 is attached to one end of each of the drive shafts 224. The gear 226 is linked to a caterpillar drive motor 262 (refer to FIG. 5) through a power transmission mechanism (unillustrated). Furthermore, a chain 228 is hung across each of the sprockets 228 attached to one of the drive shafts 224 and a corresponding one of the sprockets 228 attached to the other one of the drive shafts 224.

Additionally, a plurality of protrusions 238 each having a given thickness are provided, at given intervals, on the caterpillar 234 formed by connecting a large number of the plate pieces 232 with one another. When the caterpillar 234 is driven by the caterpillar drive motor 262, each of the protrusions 238 moves at the same time as abutting a tread surface of the wheel 20R (20F), and generates to the wheel 20R (20F): an anteroposterior force Fx, that is, a force in an anteroposterior direction of the four-wheeled motor vehicle 10; and a lateral force Fy, that is, a force in a lateral direction of the four-wheeled motor vehicle 10.

Vehicle-width direction slide guide rails 250 are extending in a direction along the drive shafts 224, that is, a vehicle width direction of the four-wheeled motor vehicle 10, and are configured so that the caterpillar 234 (the frame 222) can move in the vehicle width direction.

A bracket 256 is provided to one of the side plates 222B in a manner protruding into a part corresponding to a supporting portion 248B of a supporting frame 248, and a rotating shaft 258 on which a male screw is formed. The rotating shaft 258 is connected with a rotating shaft (unillustrated) of a vehicle-width direction motor 260 attached to the supporting portion 248B. That is, the caterpillar 234 (the frame 222) moves by having the vehicle-width direction motor 260 rotated based on control by the wheel alignment angle measuring apparatus 500.

Under a bottom portion 248A of the supporting frame 248, there are arranged: a turntable 300 for changing arrangement directions of the caterpillar 234 with respect to a horizontal diameter line (an equatorial line) of the wheel 20R (20F); and a caterpillar arrangement direction detecting unit 310 for detecting an arrangement direction of the caterpillar 234.

The turntable 300 is connected, through a feed screw (unillustrated), with a handle (unillustrated) for rotating the turntable 300. Additionally, the caterpillar arrangement direction detecting unit 310 includes a rotary encoder (unillustrated) for detecting an amount of rotation of the turntable 300, and thereby detects an arrangement direction of the caterpillar 234. Note that the turntable 300 and the caterpillar arrangement direction detecting unit 310 can assume the same configurations as a turntable and a caterpillar arrangement direction detecting unit of, for example, an apparatus disclosed in Japanese Patent Application Laid-open Publication No. 2001-30945.

Additionally, a load receiving plate member 242 is provided between the pair of main frames 222A, and flat plate guides 240 and guide plates 244 are fixed to the upper side of the load receiving plate member 242. Furthermore, an engagement groove 240A and a receiving groove 244A are carved on each of the flat plate guide 240, and on each of the guide plate 244, respectively.

A large number of balls 246 made of steel are arranged in a passage formed by each of the engagement grooves 240A and a corresponding one of the receiving grooves 244A. Additionally, rectangular grooves 242A, which are allowed to communicate with the respective passages formed by the engagement grooves 240A and the receiving grooves 244A, are provided on the load receiving plate member 242 The balls 246 revolve through the passage formed by the engagement groove 240A and the receiving groove 244A, and a passage formed by the rectangular groove 242A.

That is, even in a case where a load of the four-wheeled motor vehicle 10 is added onto the plate pieces 232 composing the caterpillar 234, the plate pieces 232 are movably supported by the flat plate guides 240, the guide plates 244 and the load receiving plate member 242, whereby the caterpillar 234 does not sag downwards due to the load of the four-wheeled motor vehicle 10, and can form a plane within a given range.

Additionally, when the anteroposterior force Fx is generated in the wheel 20R (20F) by having the caterpillar 234 driven by the caterpillar drive motor 262, the anteroposterior force Fx is transmitted to the frame 222 trough the sprockets 228, whereby the side plates 222B move in an anteroposterior direction of the four-wheeled motor vehicle 10.

When the side plates 222B move in the anteroposterior direction of the four-wheeled motor vehicle 10, measurement-use beams 252A of force sensors 252 are deformed in the anteroposterior direction, whereby a magnitude of the anteroposterior force Fx is measured by the force sensors 252.

On the other hand, when the lateral force Fy is generated in the wheel 20R (20F) by having the caterpillar 234 driven by the caterpillar drive motor 262, the lateral force Fy is transmitted to the frame 222 through the flat plate guide 240, then the balls 246, then the guide plates 244 and the load receiving plate member 242, whereby the side plates 222B move in a vehicle-width direction of the four-wheeled motor vehicle 10.

When the side plates 222B move in the vehicle-width direction of the four-wheeled motor vehicle 10, the measurement-use beams 252A of the force sensors 252 are deformed in the vehicle-width direction, whereby a magnitude of the lateral force Fy is measured by the force sensors 252.

(3) Configuration of Force Sensor

Figure 4:
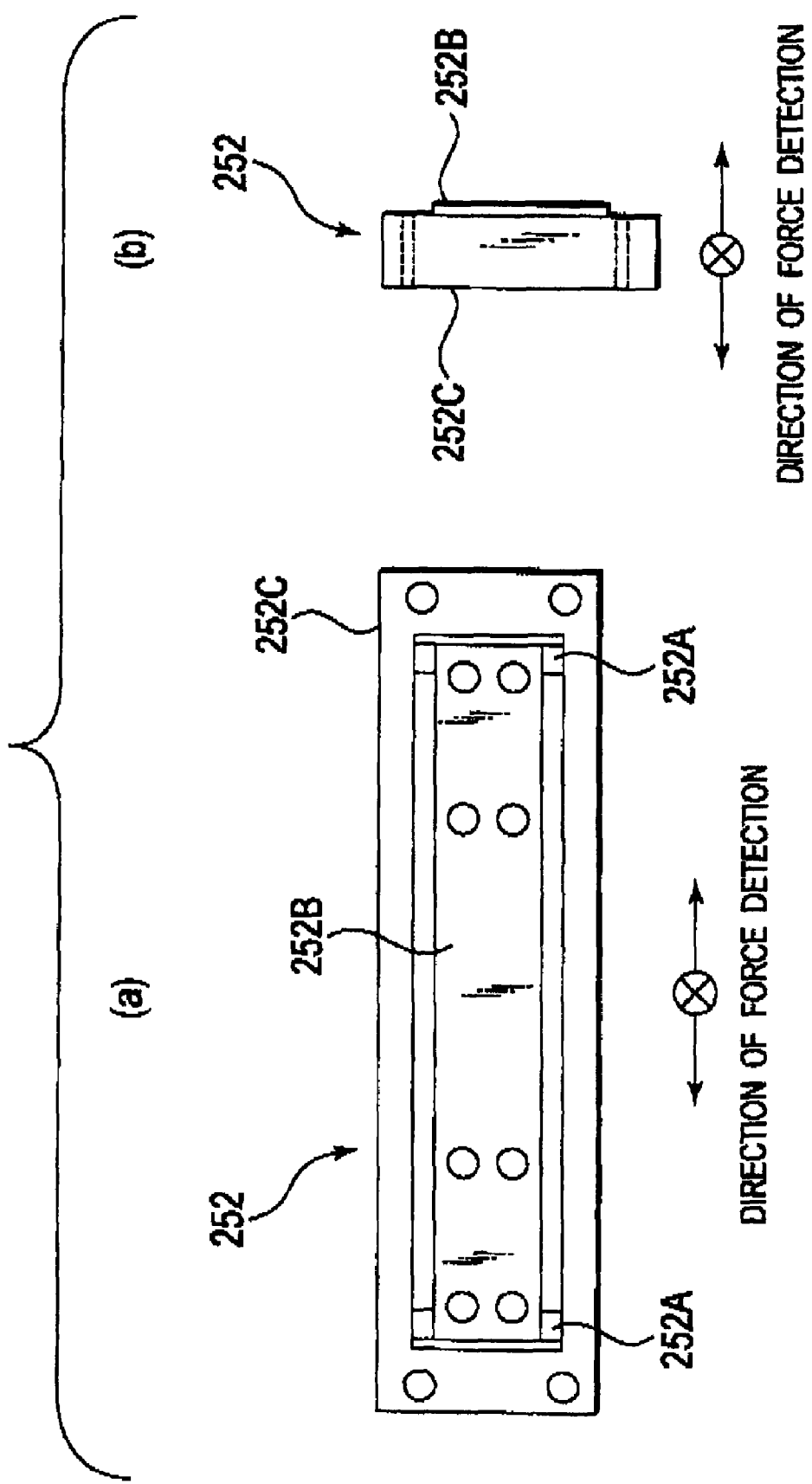
[FIG. 4]

Next, with reference to FIGS. 4(a) and 4(b), a configuration of the force sensor 252 provided to the wheel drive unit 200 (the frame 222) will be described. As shown in FIGS. 4(a) and 4(b), the force sensor 252 includes the measurement-use beams 252A, a coupling plate 252B, and a rectangular frame 252C.

Each of the measurement-use beams 252A includes a force detecting device composed of a load cell. Both end portions of the measurement-use beam 252A are fixed to the rectangular frame 252C, and a middle portion of the measurement-use beam 252A is coupled to the coupling plate 252B. Additionally, the rectangular frame 252C is attached to the side plate 222B by means of screws.

As shown in FIG. 4(a), the force sensor 252 can detect a force (the lateral force Fy) generated in the vehicle-width direction of the four-wheeled motor vehicle. Furthermore, as shown in FIG. 4(b), the force sensor 252 can detect force (the anteroposterior force Fx) generated in the anteroposterior direction of the four-wheeled motor vehicle.

(4) Logical Block Configuration of Wheel Alignment Angle Measuring System

Figure 5:
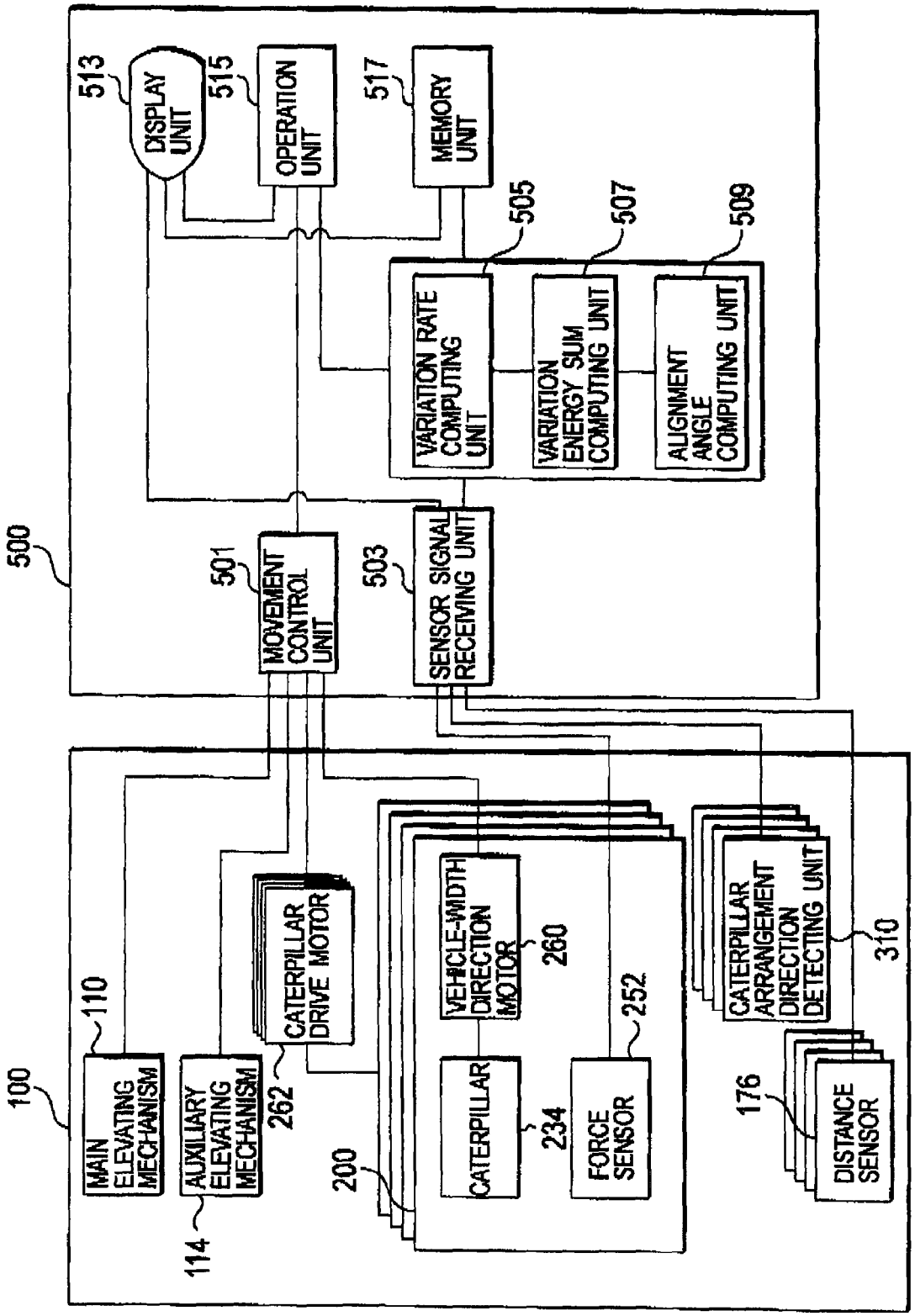
[FIG. 5]

Next, with reference to FIG. 5, description will be given of a logical block configuration of the wheel alignment angle measuring system composed of the above described wheel alignment angle measurement-use lift 100 and the wheel alignment angle measuring apparatus 500.

As shown in this drawing, the wheel alignment angle measuring apparatus 500 includes a movement control unit 501, a sensor signal receiving unit 503, a variation rate computing unit 505, a variation energy sum computing unit 507, an alignment angle computing unit 509, the display unit 513, the operation unit 515 and a memory unit 517.

Note that the wheel alignment angle measuring apparatus 500 according to this embodiment can be composed by using a computer apparatus (a personal computer) which operates on an operating system.

The movement control unit 501 is configured to control the wheel alignment angle measurement-use lift 100. Specifically, the movement control unit 501 is connected with: the main elevating mechanism 110; the auxiliary elevating mechanism 114; the vehicle-width direction motor 260 which causes the wheel drive unit 200 (the caterpillar 234) to move in the vehicle-width direction of the four-wheeled motor vehicle 10; and the caterpillar drive motor 262 which drives the caterpillar 234.

The movement control unit 501 controls, based on control information outputted by the operation unit 515, any one of the main elevating mechanism 110, the auxiliary elevating mechanism 114, the vehicle-width direction motor 260 and the caterpillar drive motor 262 which have been described above.

Due to an event that a reference wheel (for example, the wheel 20R), which is any one of wheels mounted on the four-wheeled motor vehicle 10 (the vehicle) and provided with pneumatic tires, runs on the protrusion 238 provided on the caterpillar, the sensor signal receiving unit 503 is configured to receive, in a period T (a predetermined period) including a time point when deformation of the reference wheel becomes substantially maximum, output signals from the force sensors 252 which measure the value of the lateral force Fy generated in the reference wheel.

Additionally, the sensor signal receiving unit 503 is configured to further receive, in the period T, output signals from the force sensors 252 which measure the anteroposterior force Fx generated in the wheel 20R. Note that an example where the wheel 20R is taken as the reference wheel will be described hereinafter in this embodiment.

Furthermore, the sensor signal receiving unit 503 is configured to receive output signals from: the distance sensor 176 attached to the tip of the rod 176; and the caterpillar arrangement direction detecting unit 310 which detects an arrangement direction of the caterpillar 234.

Furthermore, the sensor signal receiving unit 503 is configured to output, to the variation rate computing unit 505, data (the anteroposterior force Fx and the lateral force Fy) generated based on the output signals from the force sensors 252. Note that the sensor signal receiving unit 503 can execute the same processing as this on the non-reference wheel (the s wheel 20F).

The variation rate computing unit 505 is configured to compute anteroposterior force variation rate $d_{Fx}$ and lateral force variation rate $d_{Fy}$ by using the data of the anteroposterior force Fx and the lateral force Fy generated in the wheel 20R (20F), the anteroposterior force variation rate $d_{Fx}$ and the lateral force variation rate $d_{Fy}$ being variation rate per unit time dt of the anteroposterior force Fx and the lateral force Fy.

Specifically, the variation rate computing unit 505 computes, as the anteroposterior force variation rate $d_{Fx}$, the first-order differential value (=dFx/dt) and the second-order differential value ($=d^2Fx/dt^2$) of the anteroposterior force Fx. Additionally, the variation rate computing unit 505 computes, as the lateral force variation rate $d_{Fy}$, the first-order differential value (=dFy/dt) and the second-order differential value ($=d^2Fy/dt^2$) of the lateral force Fy.

Figure 6:
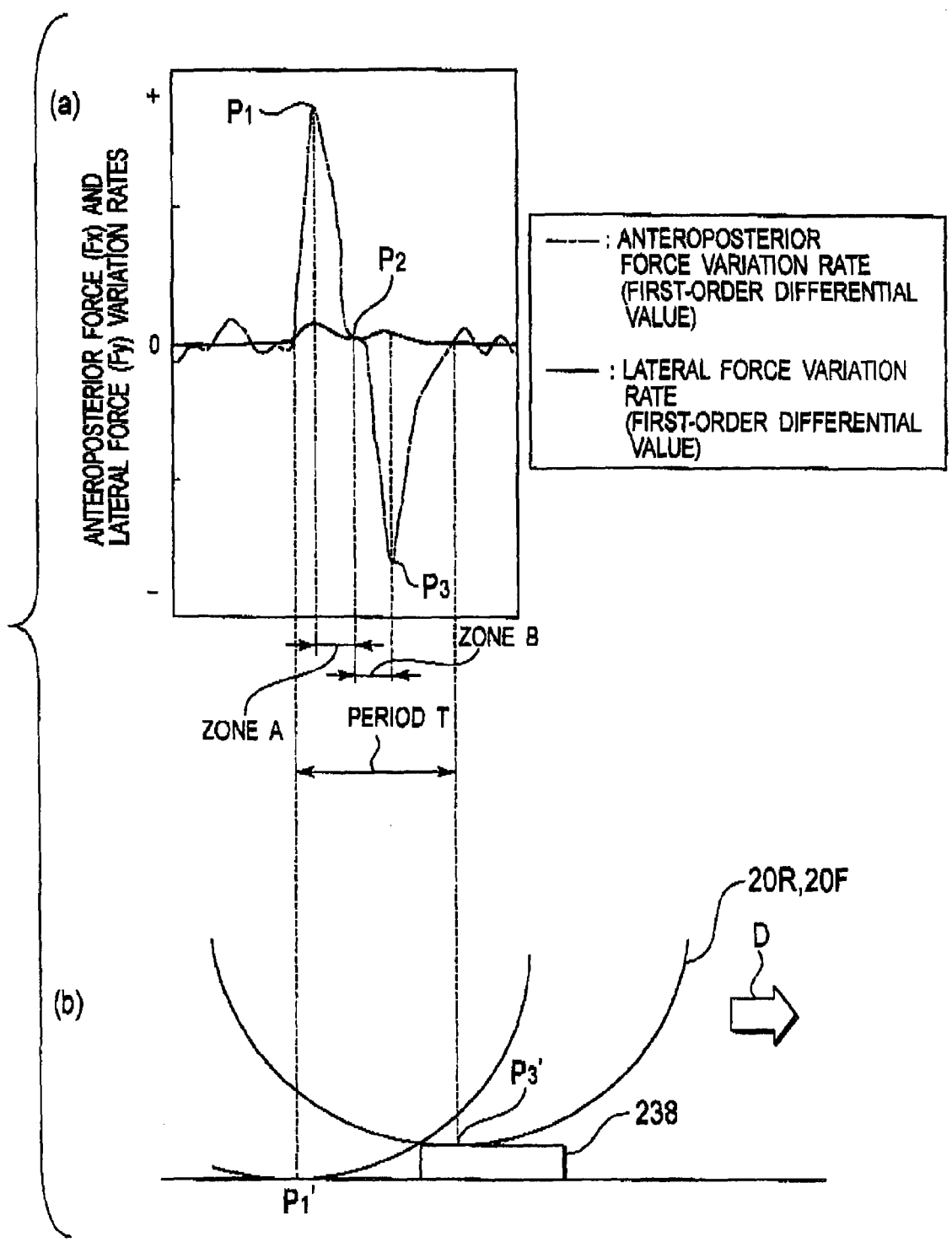
[FIG. 6]

Here, FIGS. 6(a) and 6(b) show the variation rate (the first-order differential value =dFx/dt) of the anteroposterior force Fx and the variation rate (the first-order differential value=dFy/dt) of the lateral force Fy when the reference wheel runs on the protrusion 238 provided on the caterpillar 234 and advances in a direction D (practically, the protrusion 238 provided on the caterpillar 234 advances in a direction opposite to the direction D).

In this embodiment, a period from a time point (P1') when the reference wheel (the wheel 20R) abut the protrusion 238 to a time point (P3') when the reference wheel (a pneumatic tire) returns from a deformed state after having run on the protrusion 238 is set as the period T as shown in these drawings.

The variation energy sum computing unit 507 is configured to compute a first-half-period variation energy sum (hereinafter, a variation energy sum $E_A''$) which is a sum of the lateral force variation rate $d_{Fy}$ in a zone A which is a first half period in the period T until a deformation maximum time point when deformation of the wheel 20R (20F) becomes substantially maximum due to the event that the wheel 20R (20F) runs on the protrusion 238.

The variation energy sum computing unit 507 is configured to compute a last-half-period variation energy sum (hereinafter, a variation energy sum $E_B''$) which is a sum of the lateral force variation rate $d_{Fy}$ in a zone B which is a last half period in the period T from the deformation maximum time point when deformation of the wheel 20R (20F) becomes substantially maximum due to the event that the wheel 20R (20F) runs on the protrusion 238.

Specifically, as shown in FIGS. 6(a) and 6(b), the variation energy sum computing unit 507 computes, as the variation energy sum $E_A''$, the sum total ($=\Sigma\ d^2Fy/dt^2$) of the lateral force variation rate dry (the second-order differential value) in the zone A (a period from P1 to P2 in these drawings) which is the first half period in the period T until the deformation maximum time point when the deformation of the wheel 20R (20F) becomes substantially maximum due to an event that the wheel 20R (20F) is pushed up by the protrusion 238.

Additionally, as shown in FIGS. 6(a) and 6(b), the variation energy sum computing unit 507 computes, as the variation energy sum $E_B''$, the sum total ($=\Sigma\ d^2Fy/dt^2$) of the lateral force variation rate dry (the second-order differential value) in the zone B (a period from P2 to P3 in these drawings) which is the last half period in the period T from the deformation maximum time point when the deformation of the wheel 20R (20F) becomes substantially maximum due to the event that the wheel 20R (20F) runs on the protrusion 238.

Note that, although, in this embodiment, in order to facilitate detection by the variation energy sum computing unit 507, time points (P1 and P3) when the variation rate $d_{Fx}$ of the anteroposterior force become substantially maximum are set as references in place of the time point (P1') when the wheel 20R (20F) abuts the protrusion 238 and the time point (P3') when the wheel 20R (20F) returns from a deformed state after having run on the protrusion 238, the zones A and B may be set based on these time points (P1' and P3') in a case where these time points can be accurately detected.

The alignment angle computing unit 509 is configured to compute a toe angle $T_{BR}$ (a reference wheel referencing alignment angle) at a singularity $P_{RL}$ (a singularity $P_{RR}$) which is an intersection of: a zone A straight line $S_A$ (a first-half-period straight line) determined based on plural points indicating the value of the variation energy Sum $E_A'$ in the zone A in the case where toe angles (alignment angles) of the wheel 20R (20F) vary; and a zone B straight line $S_B$ (a last-half-period straight line) determined based on plural points indicating the value of the variation energy sum $E_B''$ in the zone B in the case where toe angles (alignment angles) of the wheel 20R (20F) vary. In this embodiment, the alignment angle computing unit 509 composes a reference wheel referencing alignment angle computing unit.

Figure 9:
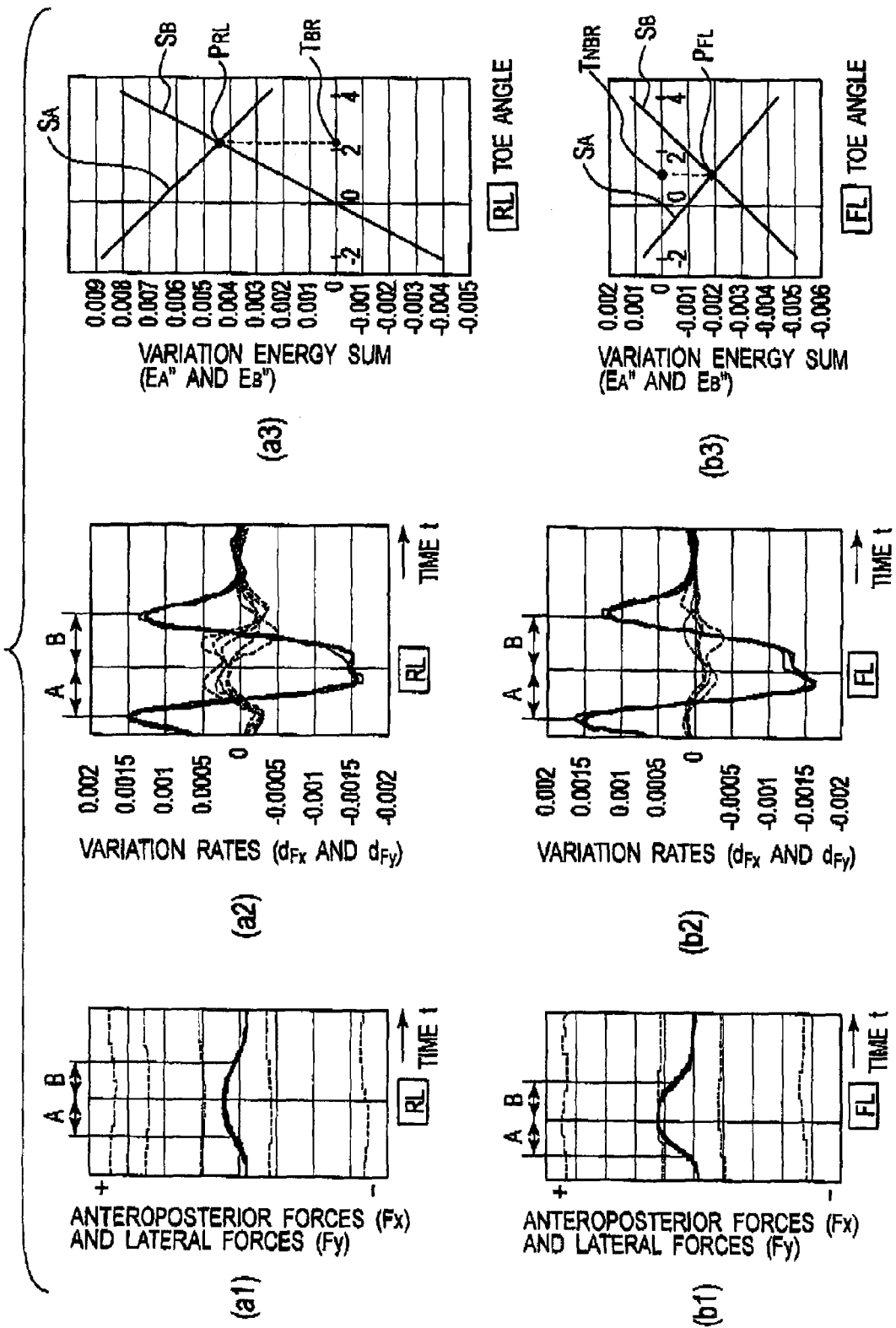
[FIG. 9]

For example, with various toe angles (for examples, four toe angles) of the wheel 20R (20F), the alignment angle computing unit 509 finds the zone A straight line $S_A$ (refer to FIG. 9(a3)) determined by a linearly interpolating value of the variation energy sum $E_A''$ at the respective toe angles.

Note that change of the toe angles of the wheel 20R (20F) can be made by changing arrangement directions of the caterpillar 234 with respect to a horizontal diameter line (an equatorial line) of the wheel 20R (20F) by rotating the turntable 300 provided under the wheel drive unit 200.

By using a method as described above, it is possible for the wheel alignment angle measuring system to be ready for a four-wheeled motor vehicle for which toe angles of the wheel 20R thereof cannot be changed. Additionally, because it is unnecessary to actually change toe angles of the wheel 20R, data on different toe angles can be quickly acquired. Needless to say, toe angles of the wheel 20R (20F) maybe changed by adjusting an attachment status of suspension of the four-wheeled motor vehicle 10, not by changing arrangement directions of the caterpillar 234 with respect to the horizontal diameter line of the wheel 20R (20F).

Furthermore, the alignment angle computing unit 509 finds the zone B straight line $S_B$ (refer to FIG. 9(a3)) determined by a linearly interpolating value of the variation energy sum $E_B''$ in the case where toe angles of the wheel 20R vary. Subsequently, the alignment angle computing unit 509 computes the toe angle $T_{BR}$ at the singularity $P_{RL}$ which is an intersection of the zone A straight line $S_A$ and the zone B straight line $S_B$.

Additionally, based on plural sums of squares of the lateral force variation rate dry in the case where toe angles (alignment angles) of the wheel 20R (20F) vary, the alignment angle computing unit 509 is configured to compute a toe angle $T_I$ (a reference wheel ideal alignment angle) giving the minimum a one of the sums of squares of the lateral force variation rate $d_{Fy}$. The alignment angle computing unit 509 composes a reference wheel ideal alignment angle computing unit in this embodiment.

Specifically, the alignment angle computing unit 509 computes, as a sum of squares of the lateral force variation rate $d_{Fy}$, a sum E'' ($=\Sigma\ (d^2Fy/dt^2)^2$) of squares of the lateral force variation rate $d_{Fy}$ (the second-order differential value) in the period T (refer to FIG. 6(a)) with respect to each of toe angles (for example, four various toe angles) of the wheel 20R which is determined to a different value.

Additionally, the alignment angle computing unit 509 is configured to compute a toe angle $T_{NBR}$ (a non-reference wheel referencing alignment angle) at a singularity $P_{FL}$ (a singularity $P_{FR}$) which is an intersection of: a zone A straight line $S_A$ and a zone B straight line $S_B$ of the wheel 20F (a non-reference wheel) mounted in a position different in an anteroposterior direction of the four-wheeled motor vehicle 10 from a position in which the wheel 20R (the reference wheel) is mounted. In this embodiment, the alignment angle computing unit 509 composes a non-reference wheel referencing alignment angle computing unit.

For example, the alignment angle computing unit 509 computes the toe angle $T_{NBR}$ at the singularity $P_{FL}$ by using the same manner as described above in the case with the wheel 20R (refer to FIG. 9(b3)).

Additionally, the alignment angle computing unit 509 is configured to compute a toe angle $T_{NBA}$ (a non-reference wheel setting alignment angle), which is set for the wheel 20F (the non-reference wheel), based on a difference between the toe angle $T_{BR}$ (the reference wheel referencing alignment angle) and the toe angle $T_I$ (the reference wheel ideal alignment angle), and the toe angle $T_{NBR}$ (the non-reference wheel referencing alignment angle). The alignment angle computing unit 509 composes a non-reference wheel setting alignment angle computing unit.

Specifically, the alignment angle computing unit 509 computes the toe angle $T_{NBA}$ by using the toe angle $T_{BR}$, and a ratio based on a difference thereof from the toe angle $T_I$. Additionally, the alignment angle computing unit 509 computes the toe angle $T_{NBA}$ by using the following equation;

$$T_{NBA}=T_{NBR}+(T_{BR}-T_I)\times((T_{NBR})^2/((T_{BR})^2+(T_{NBR})^2).$$

Note that a specific computing method of the toe angle $T_{NBA}$ will be described later.

The display unit 513 is configured to display values or graphs of: distances of the distance sensors 176 from the respective wheels, which have been outputted by sensor signal receiving unit 503; an arrangement direction (a toe angle) of the caterpillar 234 with respect to the horizontal diameter line (the equatorial line) of the wheel 20R (20F); the anteroposterior force Fx, the lateral force Fy, the variation rates ($d_{Fx}$ and $d_{Fy}$) and the variation energy sum ($E_A''$ and $E_B''$) and the like which are stored in the memory unit 517. Specifically, the display unit 513 is composed of a display device using a CRT or a LCD.

The operation unit 515 is configured to accept a content of an operation by an operator over the wheel alignment angle measuring apparatus 500. Specifically, the operation unit 515 is composed of a keyboard, a mouse and the like.

The memory unit 517 is configured to store values of the variation energy sums ($E_A''$ and $E_B''$) computed by the variation energy sum computing unit 507, and of the toe angles ($T_{BR}$, $T_I$, $T_{NBR}$, and $T_{NBA}$) computed by the alignment angle computing unit 509.

(Operations of Wheel Alignment Angle Measuring System)

Next, operations of the above described wheel alignment angle measuring system will be described.

(1) Measurement on Rear Wheel

First of all, with reference to FIG. 7, description will be given of measurement with respect to the wheel 20R which becomes a reference wheel in this embodiment.

As shown in this drawing, in step S10, the operator performs, as preparation for the measurement, a process of adjusting positions of the wheel drive units 200 so that the wheel drive units 200 (the caterpillars 234) can abut the respective wheels of the four-wheeled motor vehicle 10 placed on the placement table 112, and at the same time, a process of looking the wheels other than the wheel 20R (for example, a rear left wheel/RL) subjected to the measurement.

Here, if a placement position of the four-wheeled motor vehicle 10 is found oblique in the anteroposterior direction based on data on distances of the distance sensors 176 from the respective wheels, which is indicated on the display unit 513, whereby the operator puts the vehicle-width direction motors 260 into operation, and corrects the placement position of the four-wheeled motor vehicle 10.

In step S20, the operator operates the operation unit 515 to drive the caterpillars 234 of the wheel drive units 200. By having the caterpillars 234 driven, the protrusions 238 provided on appropriate one of the caterpillars 234 move abutting the tread surface of the wheel 20R, thereby generating the anteroposterior force Fx and the lateral force Fy in the wheel 20R.

In step S30, the wheel alignment angle measuring apparatus 500 receives output signals from the force sensors 252 provided to the wheel drive unit 200, that is, to be specific, voltage values (in volts) outputted from load cells composing the respective force sensors 252. The voltage values are determined corresponding to the anteroposterior force Fx and the lateral force Fy, and can be converted into kg with an equivalence of 100 kg/5V.

In step S40, the operator checks whether data (voltage values) on the anteroposterior force Fx and the lateral force Fy generated in the wheel 20R subjected to the measurement have been normally acquired.

It the data on the anteroposterior force Fx and the lateral force Fy generated in the wheel 20R subjected to the measurement have not been normally acquired (NO in step S40), the operator executes again the processes in steps S20 and S30. Additionally, in a case where the operator continues the measurement after changing toe angles of the other rear wheel (for example, a rear right wheel/RR) and the rear wheel (NO in step S50), the operator repetitively executes the processes in steps S10 to S40.

In this embodiment, as has been described above, change of the toe angles is made by changing arrangement directions of the caterpillar 234 with respect to the horizontal diameter line (the equatorial line) of the wheel 20R by rotating the turntable 300 provided under the wheel drive unit 200.

Additionally, in this embodiment, the processes in the above described steps S10 to S40 are executed on both of the wheels 20R (RL/RR) with respect to four (or five) various toe angles.

Note that, although this depends on a type of the pneumatic tire composing the wheel 20R (20F), 1 degree of a toe angle is roughly equivalent to 5V in voltage determined corresponding to the lateral force Fy. That is, in this embodiment, voltage values outputted by the load cells are used as they are, and therefore, toe angles are indicated by the voltage values. Needless to say, the processes can be executed after converting the voltage values into values of the toe angles. Or else, values of toe angles may be configured to be displayed instead of voltage values by previously setting correspondence between: values of toe angles obtained based on the caterpillar arrangement detecting unit 310 (a rotary encoder) which detects an amount of rotation of the turntable 300; and voltage values at these toe angles.

Additionally, in this embodiment, values of the above described four various toe angles are determined with these voltage values being in a range roughly between −3.0V and +5.0V, that is, with a range of the toe angles roughly between −0.6 degrees and +1.0 degree.

If the measurement on both of the rear wheels are completed (YES in step S50), the operator unlocks the wheels in step S60.

In step S70, by using the data of the anteroposterior force Fx and the lateral force Fy generated in the wheel 20R, the wheel alignment angle measuring apparatus 500 computes the anteroposterior force variation rate $d_{Fx}$ and the lateral force variation rate dry which are variation rates per unit time dt of the anteroposterior force Fx and the lateral force Fy.

Specifically, the wheel alignment angle measuring apparatus 500 computes, as the anteroposterior force variation rate $d_{Fx}$, the first-order differential value (=dFx/dt) and the second-order differential value (=$d^2$Fx/$dt^2$) of the anteroposterior force Fx, and computes, as the lateral force variation rate $d_{Fy}$, the first-order differential value (=dFy/dt) and the second-order differential value (=$d^2$Fy/$dt^2$) of the lateral force Fy.

Here, FIG. 9(a1) shows variation states of the anteroposterior force Fx and the lateral force Fy generated due to the event that the wheel 20R (the rear left wheel/RL) runs on the protrusion 238. Specifically, in FIG. 9(a1), there are shown variation statues of the anteroposterior force Fx and the lateral force Fy at toe angles when those forces were measured by changing a toe angle of the wheel 20R into these respective toe angles. In FIG. 9(a1), the anteroposterior force Fx is indicated by solid lines, and the lateral force Fy is indicated by dotted lines.

FIG. 9(a2) shows the anteroposterior force variation rate $d_{Fx}$ and the lateral force variation rate $d_{Fy}$ (the second-order differential value of the anteroposterior force Fx and of the lateral force Fy) computed based on the data on the anteroposterior force Fx and the lateral force Fy shown in FIG. 9(a1). In FIG. 9(a2), the second-order differential value of the anteroposterior force Fx is indicated by solid lines, and the second-order differential value of the lateral force Fy is indicated by dotted lines.

Figure 7:
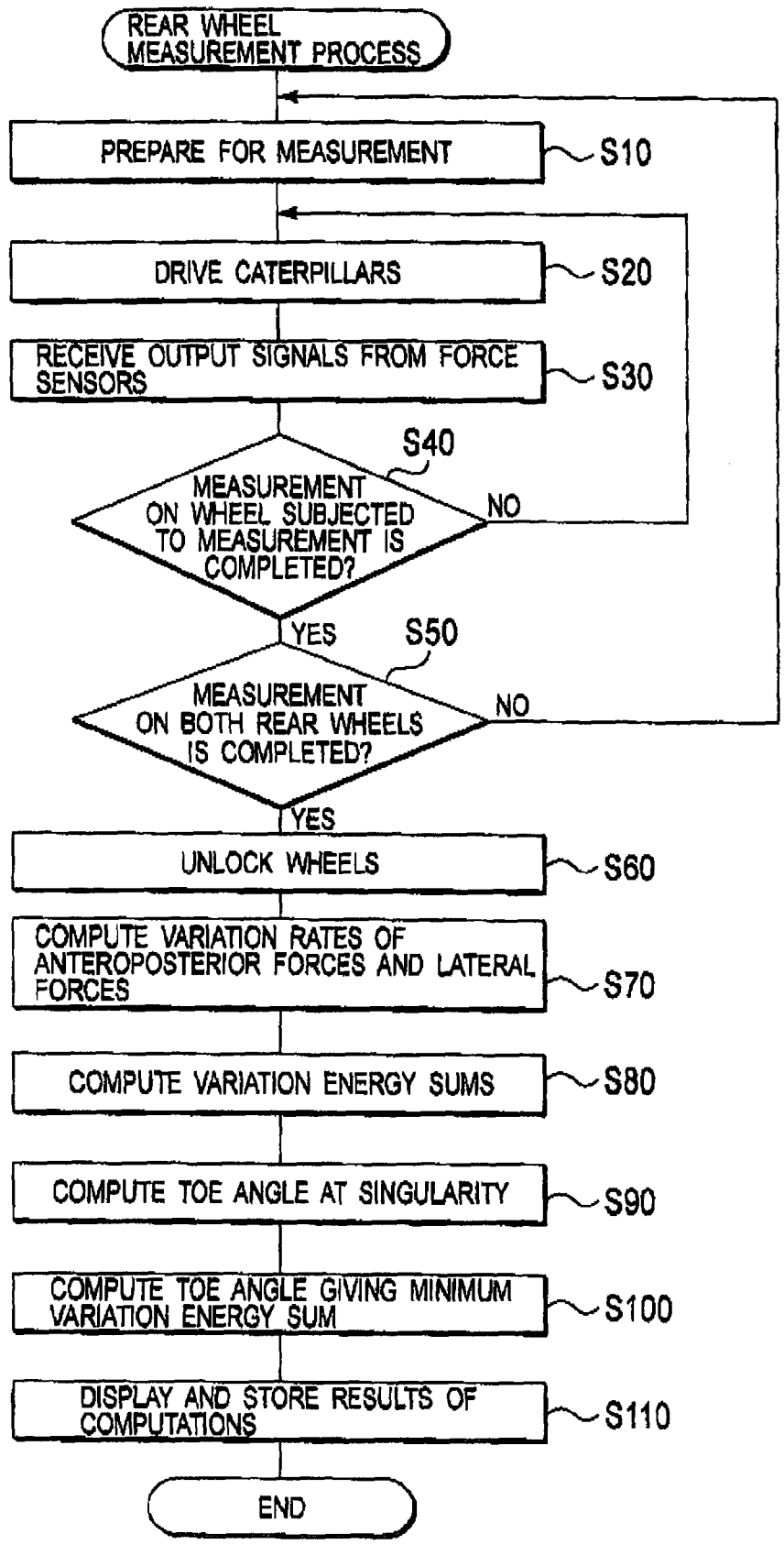
[FIG. 7]

Subsequently, as shown in FIG. 7, in step S80, the wheel alignment angle measuring apparatus 500 computes the variation energy sum $E_A''$ in the zone A, and additionally computes the variation energy sum $E_B''$ in the zone B, based on the lateral force variation rate $d_{Fy}$ (the second-order differential values of the lateral force Fy).

Note that, as has been described above, the zone A is the period (the period from P1 to P2 in FIG. 6(a)) until the deformation maximum time point when deformation of the wheel 20R becomes substantially maximum due to the event that the wheel 20R runs on the protrusion 238 (practically, the wheel 20R is pushed up by the protrusion 238 moved by the caterpillar 234).

Additionally, the zone B is the period from the deformation maximum time point when deformation of the wheel 20R becomes substantially maximum due to the event that the wheel 20R runs on the protrusion 238.

Specifically, the wheel alignment angle measuring apparatus 500 computes, as the variation energy sum $E_A''$, the sum total ($=d^2Fy/dt^2$) of the lateral force variation rate $d_{Fy}$ (the second-order differential value) in the zone A, and additionally computes, as the variation energy sum $E_B''$, the sum total ($=\Sigma\ d^2Fy/dt^2$) of the lateral force variation rate $d_{Fy}$ (the second-order differential value) in the zone B.

In step S90, the wheel alignment angle measuring apparatus 500 computes the toe angle $T_{BR}$ (the reference wheel referencing alignment angle) at the singularity $P_{RL}$ (or, the singularity $P_{RR}$ of the rear right wheel/RR), which is an intersection of the zone A straight line $S_A$ determined based on the plural points indicating the value of the variation energy sum $E_A''$, and the zone B straight line $S_B$ determined based on plural points indicating the value of the variation energy sum $E_B''$ in the zone B, in the case where toe angles of the wheel 2OR (the rear left wheel/RL) vary.

Specifically, the wheel alignment angle measuring apparatus 500 finds the zone A straight lines $S_A$, $S_B$ respectively determined by linearly interpolating values of the variation energy sums $E_A''$ and $E_B''$ at the respective toe angles. Furthermore, the wheel alignment angle measuring apparatus 500 computes the toe angle $T_{BR}$ at the singularity $P_{RL}$ (the singularity $P_{RR}$).

Here, FIG. 9(a3) shows the singularity $P_{RL}$ which is an intersection of the zone A straight line $S_A$ and the zone B straight line $S_B$ of the wheel 20R (the rear left wheel/RL) which have been described above. In FIG. 9(a3), a voltage value which is determined corresponding to the toe angle $T_{BR}$ at the singularity $P_{RL}$ is computed as approximately 2.414V.

Subsequently, as shown in FIG. 7, in step S100, based on plural sums of squares of the lateral force variation rate $d_{Fy}$ in the case where toe angles of the wheel 20R vary, the wheel alignment angle measuring apparatus 500 computes the toe angle $T_I$ (the reference wheel ideal alignment angle) giving the minimum one of the sums of squares thereof.

Specifically, the wheel alignment angle measuring apparatus 500 computes a sum $E''$ ($=\Sigma\ (d^2Fy/dt^2)^2$) of squares of the lateral force variation rate $d_{Fy}$ (the second-order differential value) in the period T (refer to FIG. 6(a)) with respect to each of the toe angles of the wheel 20R which is determined to a different value.

In step S110, the wheel alignment angle measuring apparatus 500 ends the measurement with respect to the wheel 20R by displaying and storing results of the computations in steps S70 to S90. Note that the process in step S100 may be executed parallel to the process in step S80, or prior to the process in step S80.

(2) Measurement on Front Wheel

Next, with reference to FIG. 8, description will be given of measurement with respect to the wheel 20R which becomes a non-reference wheel in this embodiment. Note that the same processes as those in the case with the above described wheel 20R will be omitted as appropriate.

As shown in this drawing, processes in steps S210 to S280 are the same as the processes (refer to FIG. 7) in steps S10 to S80, and the same processes are determined also to the wheel 20F.

In step S290, the wheel alignment angle measuring apparatus 500 computes the toe angle $T_{NBR}$ (the non-reference wheel referencing alignment angle) at the singularity $P_{FL}$ (or, the singularity $P_{FR}$ of a front right wheel), which is an intersection of the zone A straight line $S_A$ and the zone B straight line $S_B$ of the wheel 20F (the non-reference wheel), which is mounted in a position different in an anteroposterior direction of the four-wheeled motor vehicle 10 from a position in which the wheel 20R (the reference wheel) is mounted.

Specifically, the wheel alignment angle measuring apparatus 500 computes the toe angle $T_{NBR}$ at the singularity $P_{FL}$ (the singularity $P_{FR}$) by the same process (refer to step S90) as in the case with the above described wheel 20R.

Here, FIGS. 9(b1) to (b3) show data on the wheel 20F (a front left wheel/FL), FIG. 9(b1) shows variation states of the anteroposterior force Fx and the lateral force Fy, FIG. 9(b2) shows the anteroposterior force variation rate $d_{Fx}$ and the lateral force variation rate $d_{Fy}$ (the second-order differential value of the anteroposterior force Fx and the lateral force Fy) computed based on data on the anteroposterior force Fx and the lateral force Fy, and FIG. 9(b3) shows the singularity $P_{FL}$ which is an intersection of the zone A straight line $S_A$ and the zone B straight line $S_B$. In FIG. 9(a3), a voltage value which is determined corresponding to the toe angle $T_{NBR}$ at the singularity $P_{FL}$ is computed as approximately 0.710V.

Figure 8:
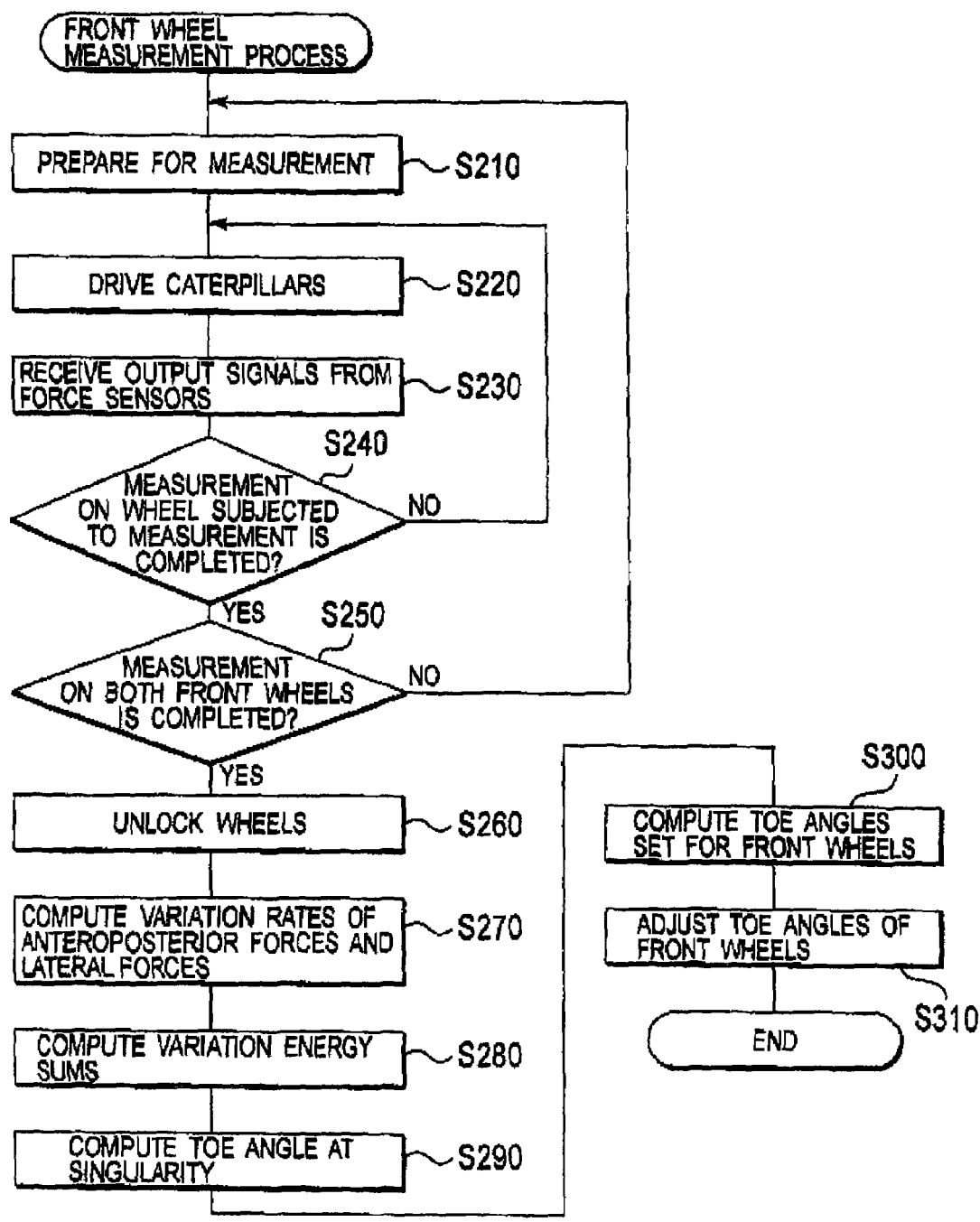
[FIG. 8]

Subsequently, as shown in FIG. 8, in step S300, the wheel alignment angle measuring apparatus 500 computes the toe angle $T_{NBA}$ (the non-reference wheel setting alignment angle) determined for the wheel 20F (the non-reference wheel), based on a difference between the toe angle $T_{BR}$ (the reference wheel referencing alignment angle) and the toe angle $T_I$ (the reference wheel ideal alignment angle), and the toe angle $T_{NBR}$ (the non-reference wheel referencing alignment angle).

Figure 10:
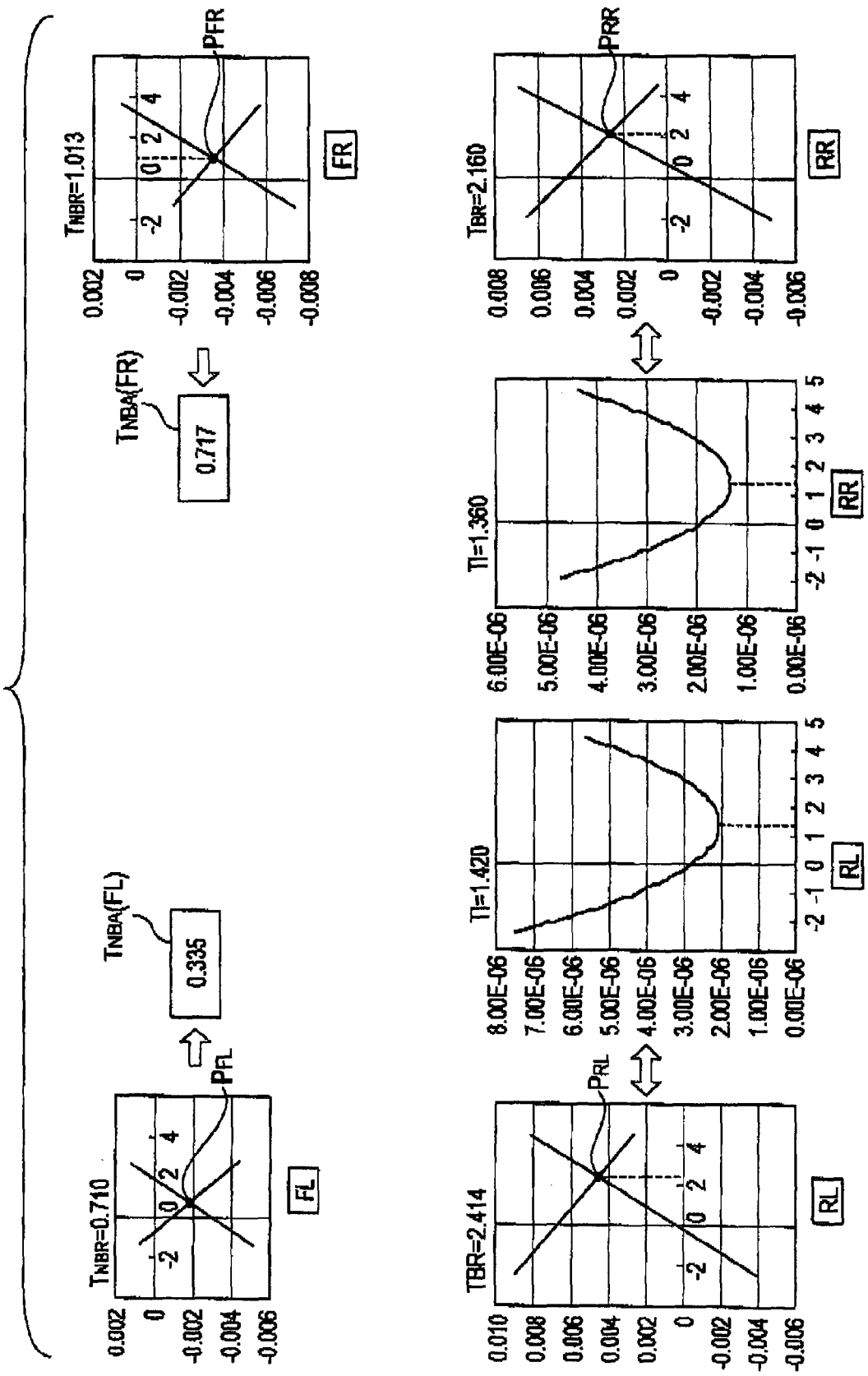
[FIG. 10]

Here, with reference to FIG. 10, a computing method of the toe angle $T_{NBA}$ will be described. First of all, based on a value of the toe angles $T_{BR}$ of a rear wheel shaft (RL/RR), and of the toe angles $T_{NBR}$ of a front wheel shaft (FL/FR), the wheel alignment angle measuring apparatus 500 computes a ratio (a moment ratio) of the referencing toe angles ($T_{BR}$ and $T_{NBR}$) of the rear wheel shaft and the front wheel shaft as follows:

(0710V+1.013V)/(2.41V+2.16V)≈0.377

Subsequently, the wheel alignment angle measuring apparatus 500 computes the differences of the toe angles $T_{BR}$ from the toe angles $T_I$ as follows:

2.414V−1.420V=0.994V    (the rear left wheel/RL), and 2.160V−1.360V=0.800V    (the rear right wheel/RR)

Furthermore, by using the above described moment ratio, and the differences of the toe angle $T_{BR}$ from the toe angle $T_I$, the wheel alignment angle measuring apparatus 500 computes the toe angles $T_{NBA}$ as follows:

0.710V−(0.994V×0.377)≈0.335V    (the front left wheel/FL), and 1.013V−(0.800V×0.377)≈0.717V    (the front right wheel/FR)

Note that the wheel alignment angle measuring apparatus 500 may compute the toe angle $T_{NBA}$ not by using the above described computing method, but by using the following equation:

$$T_{NBA}=T_{NBR}+(T_{BR}-T_I)\times((T_{NBR})^2/((T_{BR})^2+(T_{NBR})^2$$

Subsequently, as shown in FIG. 8, in step S310, the operator adjusts attachment conditions of a front wheel suspension (unillustrated) of the four-wheeled motor vehicle 10, based on a value of the toe angle $T_{NBA}$ (the voltage value) determined for the wheel 20F which has been computed in step S300, so that the wheel 20F can have the toe angle $T_{NBA}$.

Note that the operator determines, based on the voltage value determined corresponding to the toe angle $T_{NBA}$, a degree of the toe angle $T_{NBA}$ determined for the wheel 20F of the four-wheeled motor vehicle 10 (as has been described above, 1 degree of a toe angle is roughly equivalent to 5V in voltage although this equivalence depends on the type of the pneumatic tire composing the wheel 20R (20F)), and thereby adjusts the wheel 20F so as to have that toe angle.

(Comparative Assessment)

Next, with reference to FIGS. 11 to 13(c), description will be given of a method and results of comparative assessment test regarding traveling stabilities (steerability and stability) performed on a four-wheeled motor vehicle determined at the toe angles $T_{NBA}$ computed by the above described wheel alignment angle measuring system.

(1) Comparison Regarding Traveling Stability by Test Driver

Figure 11:
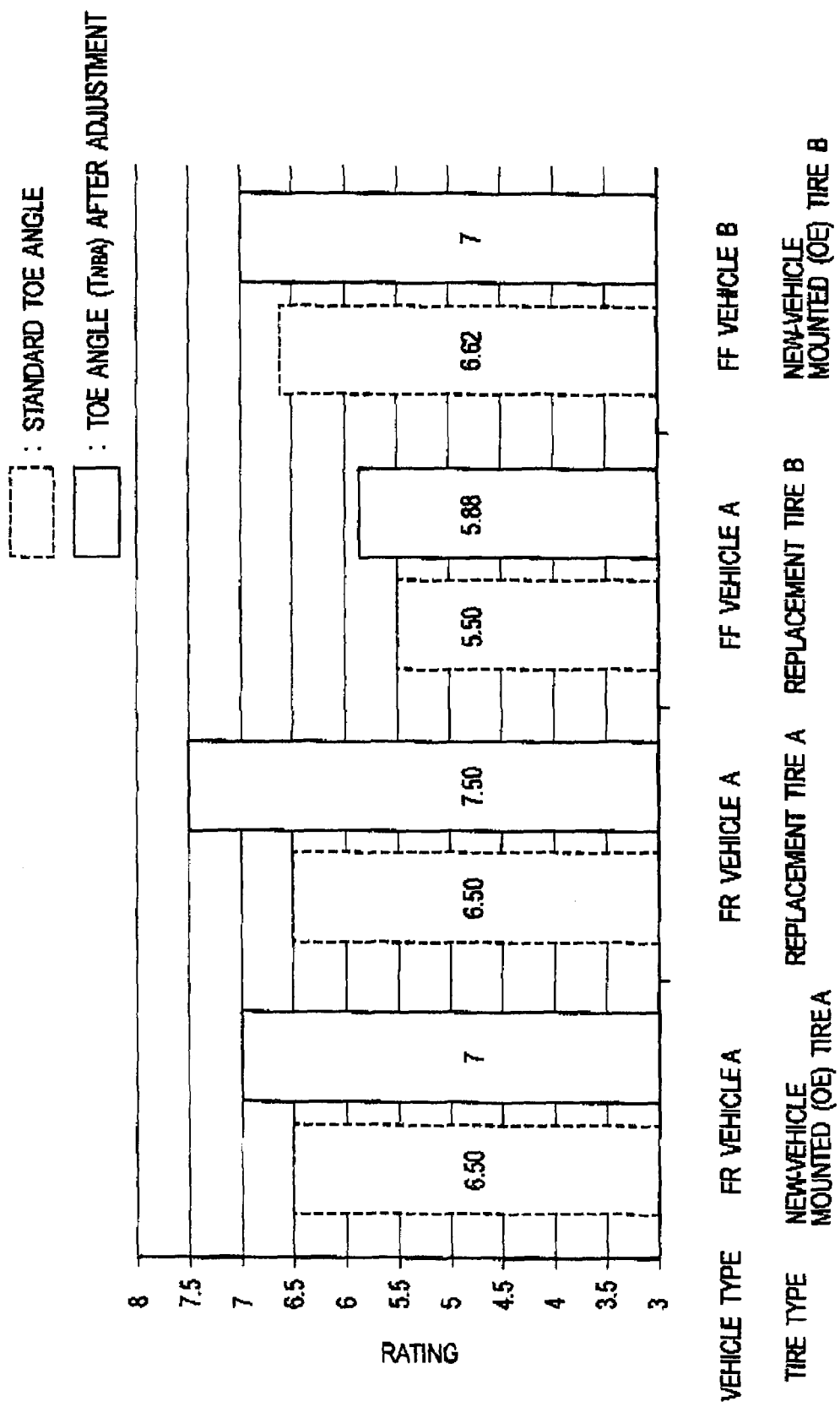
[FIG. 11]

FIG. 11 shows, in the form of a graph, results of feeling evaluations performed by a test driver. As shown in this drawing, with respect to each of four-wheeled motor vehicles of three types different in drive method and displacement, traveling stabilities thereof in a state determined at standard toe angles (toe angles determined for a new vehicle) and in a state determined at the toe angles $T_{NBA}$ (toe angles after adjustment) were compared with each other.

Note that test conditions and the like are as follows:
Vehicle types (Drive methods): an FR vehicle A, an FF vehicle A and an FF vehicle B,
Mounted tire types: new-vehicle mounted (OE) tires A and B, and replacement tires A and B,
Rating basis: 6 for "barely satisfactory," 7 for "almost satisfactory" and 8 for "satisfactory," and
Difference levels between ratings: ±0.5 for "a slight difference exists," ±1.0 for "a difference exists," and ±2.0 for "a large difference exists,"

As shown in this drawing, of all the vehicle types, the traveling stabilities after the vehicles had been adjusted at the toe angles $T_{NBA}$ were improved. Additionally, even in the case where the different tires (the new-vehicle mounted (OE) tire A and the replacement tire A) were mounted on the vehicles of the same vehicle type (the FR vehicle A), the traveling stabilities after the vehicles had been adjusted at the toe angles $T_{NBA}$ were improved.

That is, it was confirmed that, regardless of types of the four-wheeled motor vehicles and of the tires mounted thereon, the four-wheeled motor vehicles adjusted at the toe angles $T_{NBA}$ computed by using the wheel alignment angle measuring system were found improved in traveling stability as compared to those in the case where they are determined at the standard toe angles.

(2) Comparison Regarding Input Amount to Suspension

FIGS. 12(a) and 12(b) are provided for comparison between variation states of input amounts to suspensions (specifically, each of the front and rear, left and right lower arms) of the above described FF vehicle B.

Specifically, FIG. 12(a) shows superposed input variation states of the respective front and rear, left and right lower arms in a case where the FF vehicle B was determined at the standard toe angles, and was caused to travel on an expressway for about 6 minutes. On the other hand, FIG. 12(b) shows superposed input variation states of the respective front and rear, left and right lower arms in a case where the FF vehicle B was determined at the toe angles $T_{NBA}$ (toe angles after adjustment), and was caused to travel on an expressway for about 6 minutes.

In the case where the FF vehicle B was determined at the toe angles $T_{NBA}$, the sum totals of variation rate (first-order differential value) of inputs to the lower arms were improved by 14 to 15% as compared to those in the case where the FF vehicle B was determined at the standard toe angles. Specifically, in the case where the FF vehicle B was determined at the toe angles $T_{NBA}$, the sum totals were reduced to 0.8517 in the front lower arm and to 0.8636 in the rear lower arm in ratio to those in the case where the FF vehicle B was determined at the standard toe angles.

Additionally, as shown in FIG. 12(b), in the case where the FF vehicle B was determined at the toe angles $T_{NBA}$, the variation rate was smaller, and frequencies of making variations in a wider range were smaller than in the case where the FF vehicle B was determined at the standard toe angles.

That is, if a four-wheeled motor vehicle is determined at the toe angles $T_{NBA}$ computed by using the wheel alignment angle measuring system, a force transmitted to the four-wheeled motor vehicle (lower arms of suspensions thereof) through the wheel 20R (20F) is reduced, whereby what is termed vibration riding comfort can be enhanced.

(3) Behavior Comparison of Four-wheeled Motor Vehicle

FIGS. 13(a) to 13(c) show results of a test carried out for performing more objective comparative assessment on traveling stability of a four-wheeled motor vehicle determined at the toe angles $T_{NBA}$ computed by using the wheel alignment angle measuring system. Note that the four-wheeled motor vehicle used in this test is the above described FR vehicle A.

Specifically, FIGS. 13(a) to 13(c) show (1) yaw rates, (2) steering angles, and (3) roll amounts in slalom traveling by the four-wheeled motor vehicle. Additionally, vertical axes of graphs shown in FIGS. 13(a) to 13(c) represent the above-mentioned (1) to (3) with respect to certain directions as plus, and the abovementioned (1) to (3) with respect to directions opposite to the respective directions as minus. It should be noted that the respective directions (for example, directions of the yaw rates and the steering angles) indicated as plus and as minus vary from one another.

Specifically, FIG. 13(a) shows results of the slalom traveling in a state where the four-wheeled motor vehicle was determined at a toe angle offset by 1 degree from the toe angles $T_{NBA}$ toward the "outer side" (outward in the vehicle-width direction of the four-wheeled motor vehicle 10). On the other hand, FIG. 13(b) shows results of the slalom traveling in a state where the four-wheeled motor vehicle was determined at a toe angle offset by 1 degree from the toe angles $T_{NBA}$ toward the "inner side" (inward in the vehicle-width direction of the four-wheeled motor vehicle 10). Additionally, FIG. 13(c) shows results of the slalom traveling in a state where the four-wheeled motor vehicle was determined at the toe angles $T_{NBA}$.

When FIGS. 13(a) to 13(c) are compared, in FIG. 13(a), the yaw rate stopped following increase of the steering angle in midstream, and hit a "growth ceiling." That is, as the steering angle is increased, generating a cornering force according to the steering angle becomes impossible from a certain timing, and, from the certain timing, the deriver comes to have a "feeling that a steering wheel can hardly be turned."

In FIG. 13(b), the yaw rate arose with a delay as compared to increase of the steering angle, and was slow in responding to the steering angle. Additionally, as compared to FIGS. 13(a) and 13(c), the roll amount was large.

In FIG. 13(c), as compared to FIGS. 13(a) and 13(b), the yaw rate linearly followed increase of the steering angle, and the deriver comes to have a feeling that, while the four-wheeled motor vehicle responds quickly to a steering operation, a steering characteristic thereof seems to be substantially in the neutral steer condition.

In FIG. 13(c), as compared to FIGS. 13(a) and 13(b), the roll amount particularly when the steering angle is returned to substantially 0 degree, that is, the roll amount to an opposite side when the four-wheeled motor vehicle returns to straight traveling, was small, This means that what is termed a "settled feeling" was favorable, and it is found that excellent characteristics in steerability and stability were exhibited.

(Functions and Effects)

In accordance with the above described wheel alignment angle measuring system (the wheel alignment angle measurement-use lift 100 and the wheel alignment angle measuring apparatus 500) according to this embodiment, the toe angle $T_{NBA}$ (the non-reference wheel setting alignment angle) is computed based on the toe angle $T_{BR}$ (the reference wheel angle referencing alignment angle) which is an alignment angle at the an intersection (singularity $P_{RL}$ or $P_{FL}$) of the zone A straight line $S_A$ determined based on the value of the variation energy sum $E_A''$ and the zone B straight line $S_B$ determined based on the value of the variation energy sum $E_B''$.

For this reason, unlike in the above described conventional alignment angle (toe angle) adjusting method, the toe angle $T_{NBA}$ can be easily and reliably determined without requiring such a complex process of approximating, to temporal changes of the lateral force Fy generated in the wheel 20R (the reference wheel), temporal changes of the lateral force Fy generated in the wheel 20F (the non-reference wheel).

Additionally, while there has been a problem in the conventional alignment angle adjusting method that there is a case where temporal changes of the lateral force Fy generated in the wheel 20F (the non-reference wheel) cannot be sufficiently approximated to temporal changes of the lateral force Fy generated in the wheel 20R (the reference wheel), such a problem can be avoided.

That is, because the toe angle $T_{NBA}$ of the wheel 20F (the non-reference wheel) is determined by using the toe angle $T_{BR}$ with which the variation energy sum $E_A''$ and the variation energy sum $E_B''$ become equal to each other, characteristics of the lateral force Fy generated in the wheel 20F (a front wheel) and in the wheel 20R (a rear wheel) are balanced with each other, whereby a value of the toe angle $T_{NBA}$, which enables characteristics of the lateral force Fy generated in the wheel 20F (a front wheel) and in the wheel 20R (a rear wheel) to be approximated to each other, can be easily determined.

More specifically, moments of the four-wheeled motor vehicle 10 which are generated because of the lateral force Fy generated in the respective wheels can be balanced with each other in the vicinity of the center of gravity of a vehicle body composing the four-wheeled motor vehicle 10.

That is, after having established a hypothesis that the moments of the four-wheeled motor vehicle 10 can be balanced in the vicinity of the center of gravity of the vehicle body by equalizing ratios of outputs (the variation energy sum $E_B''$) due to inputs (the variation energy sum $E_A''$) from disturbance (running on the protrusions 238) against the respective wheels (RL/RR/FL/FR) of the four-wheeled motor vehicle 10, the inventor proved that the hypothesis is viable through the above described comparative assessment test.

A steering characteristic of the four-wheeled motor vehicle 10 determined at the toe angle $T_{NBA}$ comes close to the neutral steer condition as has been described above. That is, the four-wheeled motor vehicle 10 comes to show linear and stable behavior, whereby traveling stability, such as steerability and stability, of the four-wheeled motor vehicle is further enhanced.

Furthermore, in the four-wheeled motor vehicle 10 determined at the toe angles $T_{NBA}$, a force transmitted to the four-wheeled motor vehicle 10 through the wheel 20R (20F) is reduced, whereby what is termed vibration riding comfort can be enhanced.

Additionally, because the toe angle $T_{NBA}$ is thus determined, the toe angle $T_{NBA}$ can be computed even in a case where the variation energy sums of the reference wheel and the non-reference wheel are greatly different from each other for such reasons as a difference in suspension type of the four-wheeled motor vehicle 10. That is, the toe angle $T_{NBA}$ can be computed without being affected by a suspension type of the four-wheeled motor vehicle 10.

Additionally, in accordance with the wheel alignment angle measuring system according to this embodiment, the toe angle $T_{NBA}$ that should be determined is computed based on the anteroposterior force Fx and the lateral force Fy generated in the respective wheels, whereby a more appropriate toe angle can be easily determined in a case where a pneumatic tire or a tire wheel has been replaced.

OTHER EMBODIMENTS

While contents of the present invention have been disclosed by way of one embodiment of the present invention, it should not be understood that descriptions and the drawings constituting a part of this disclosure may limit the present invention. From this disclosure, various alternative embodiments, examples and operational techniques will be apparent to those skilled in the art.

For example, while the description has been given in the above described embodiment of the present invention by taking as an example the four-wheeled motor vehicle 10 which is an passenger automobile, the present invention can be applied not only to a passenger automobile, but also to an SUV, a truck and a bus.

Additionally, while the sum totals ($=\Sigma\ d^2Fy/dt^2$) of the lateral force variation rate $d_{Fy}$ (the second-order differential values) are used as the variation energy sum $E_A''$ and the variation energy sum $E_B''$ in the above described embodiment of the present invention, the sum totals ($=\Sigma\ dFy/dt$) of the first-order differential values or the sum totals ($=\Sigma\ d^3Fy/d^3t$) of the third-order differential values may be used as the variation energy sum $E_A''$ and the variation energy sum $E_B''$.

Additionally, the singularity ($P_{RL}$ or the like) may be found by using values which are squares of differences of the variation energy sum $E_A''$ from the variation energy sum $E_B''$.

Furthermore, while measurement and computation is performed on toe angles by assuming the toe angles as alignment angles of the wheel 20R (20F) in the above described embodiment of the present invention, the present invention can also be applied to measurement and computation of, for example, camber angles in place of the toe angles.

Additionally, while the wheel 20R (a rear wheel) is determined as the reference wheel in the above described embodiment of the present invention, the wheel 20F (a front wheel) may be determined as the reference wheel depending on the suspension type of the four-wheeled motor vehicle 10.

Furthermore, the movement control unit 501, the sensor signal receiving unit 503, the variation rate computing unit 505, the variation energy sum computing unit 507 and the alignment angle computing unit 509 which compose the above described wheel alignment angle measuring apparatus 500 can also be provided in the form of programs executable by a computer apparatus such as a personal computer.

Thus, it is obvious that the present invention includes various embodiments or the like which are not herein described. Accordingly, a technical scope of the present invention is determined only by features of the invention according to the scope of the claims considered appropriate from the above description.

INDUSTRIAL APPLICABILITY

As has been described hereinabove, the wheel alignment angle measuring apparatus according to the present invention is capable of determining a value of an alignment angle enabling characteristics of lateral forces generated respectively in a front wheel and in a rear wheel to be further approximated to each other, and therefore, is useful in such areas as adjustment of an alignment angle of a wheel.

The invention claimed is:

1. A wheel alignment angle measuring apparatus comprising:
    a sensor signal receiving unit configured to receive output signals from a sensor which measures a value of a lateral force generated in a reference wheel in a predetermined period including a deformation maximum time point when deformation of the reference wheel becomes substantially maximum due to an event that the reference wheel runs on a predetermined protrusion, the reference wheel being any one of wheels provided with pneumatic tires and mounted on a vehicle;
    a variation energy sum computing unit configured to compute a first-half-period variation energy sum which is a sum of variation rate of the lateral force in a first half period until the deformation maximum time point, and a last-half-period variation energy sum which is a sum of variation rate of the lateral force in a last half period from the deformation maximum time point using the output signals respectively;
    a reference-wheel referencing alignment angle computing unit configured to compute a reference wheel referencing alignment angle which is an alignment angle at an intersection of a first-half-period straight line determined based on a value of the first-half-period variation energy sum when an alignment angle of the reference wheel vary, and a last-half-period straight line determined based on a value of the last-half-period variation energy sum when the alignment angle of the reference wheel vary; and
    a non-reference wheel setting alignment angle computing unit configured to compute, based on the reference wheel referencing alignment angle, a non-reference wheel setting alignment angle to be specified for a non-reference wheel mounted on the vehicle in a position different in an anteroposterior direction from a position in which the reference wheel is mounted.

2. The wheel alignment angle measuring apparatus according to claim 1, further comprising a reference wheel ideal alignment angle computing unit configured to compute, based on the sum of squares of variation rate of the lateral force when the alignment angle of the reference wheel vary, a reference wheel ideal alignment angle giving the minimum sum of squares of the variation rate, and
    the reference wheel ideal alignment angle computing unit computes the non-reference wheel setting alignment angle based on the reference wheel referencing alignment angle and the reference wheel ideal alignment angle.

3. The wheel alignment angle measuring apparatus according to claim 2, further comprising a non-reference wheel referencing alignment angle computing unit configured to compute a non-reference wheel referencing alignment angle which is an alignment angle at an intersection of a first-half-period straight line of the non-reference wheel, and a last-half-period straight line, and
    the non-reference wheel referencing alignment angle computing unit computes the non-reference wheel referencing alignment angle based on a difference between the reference wheel referencing alignment angle and the reference wheel ideal alignment angle, and the non-reference wheel referencing alignment angle.

4. The wheel alignment angle measuring apparatus according to claim 2, wherein the reference wheel ideal alignment angle computing unit computes the sum of squares by using a second-order differential value of the lateral force as the variation rate of the lateral force.

5. The wheel alignment angle measuring apparatus according to claim 1, wherein
    the sensor signal receiving unit further receives output signals from a sensor which measures a value of an anteroposterior force generated in the reference wheel in the predetermined period, and
    the variation energy sum computing unit determines any one of the first half period and the last half period based on a first-order differential value of the anteroposterior force.

6. The alignment angle measuring apparatus according to claim 1, wherein the variation energy sum computing unit computes any one of the first-half-period variation engery sum in the last-half-period variation energy sum by using a second-order differential value of the lateral force as the variation rate of the lateral force.

7. A wheel alignment angle measuring method comprising the steps of:
    receiving output signals from a sensor which measures a value of a lateral force generated in a reference wheel in a predetermined period including a deformation maximum time point when deformation of the reference wheel becomes substantially maximum due to an event that the reference wheel runs on a predetermined protrusion, the reference wheel being any one of wheels provided with pneumatic tires and mounted on a vehicle;
    computing a first-half-period variation energy sum which is a sum of variation rate of the lateral force in a first half period until the deformation maximum time point, and a last-half-period variation energy sum which is a sum of variation rate of the lateral force in a last half period from the deformation maximum time point using the output signals respectively;
    computing a reference wheel referencing alignment angle which is an alignment angle at an intersection of a first-half-period straight line determined based on a value of the first-half-period variation energy sum when an alignment angle of the reference wheels vary, and a last-half-period straight line determined based on a value of the last-half-period variation energy sum when the alignment angle of the reference wheel vary; and computing a non-reference wheel setting alignment angle based on the reference wheel referencing alignment angle, the non-reference wheel setting alignment angle to be specified for a non-reference wheel mounted on a vehicle in a position different in an anteroposterior direction from a position in which the reference wheel is mounted.

8. The wheel alignment angle measuring method according to claim 7, further comprising the step of computing a reference wheel ideal alignment angle based on a sum of squares of variation rate of the lateral force when the alignment angle of the reference wheel vary, the reference wheel ideal alignment angle giving the minimum sum of squares of the variation rate, and in the step of computing the non-reference wheel setting alignment angle, the non-reference wheel setting alignment angle is computed based on the reference wheel referencing alignment angle and the reference wheel ideal alignment angle.

9. The wheel alignment angle measuring method according to claim 8, wherein in the step of computing the reference wheel ideal alignment angle, the sum of squares is computed by using the second-order differential value of the lateral force as the variation rate of the lateral force.

10. The wheel alignment angle measuring method according to claim 7, further comprising the step of computing a non-reference wheel referencing alignment angle which is an alignment angle at an intersection of a first-half-period straight line of the non-reference wheel, and a last-half-period straight line, and in the step of computing the non-reference wheel referencing alignment angle, the non-reference wheel referencing alignment angle is computed based on the non-reference wheel referencing alignment angle and a difference between the reference wheel referencing alignment angle and the reference wheel ideal alignment angle.

11. The wheel alignment angle measuring method according to claim 7, wherein, in the step of receiving the output signals, output signals from a sensor which measures a value of an anteroposterior force generated in the reference wheel in the predetermined period are further received, and in the step of computing the variation energy sum, any one of the first half period and the last half period is determined based on the first-order differential value of the anteroposterior force.

12. The wheel alignment angle measuring method according to claim 7, wherein in the step of computing the variation energy sum, any one of the first-half-period variation energy sum and the last-half-period variation energy sum is computed by using the second-order differential value of the lateral force as the variation rate of the lateral force.

* * * * *